(12) United States Patent
Hamaguchi

(10) Patent No.: US 12,406,976 B2
(45) Date of Patent: Sep. 2, 2025

(54) ELECTRODE MANUFACTURING METHOD

(71) Applicant: Masaya Hamaguchi, Kanagawa (JP)

(72) Inventor: Masaya Hamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 494 days.

(21) Appl. No.: 17/809,367

(22) Filed: Jun. 28, 2022

(65) Prior Publication Data

US 2023/0028756 A1     Jan. 26, 2023

(30) Foreign Application Priority Data

Jul. 16, 2021 (JP) .................................. 2021-118051
May 31, 2022 (JP) .................................. 2022-088736

(51) Int. Cl.
*H01M 4/04* (2006.01)
*H01M 4/66* (2006.01)

(52) U.S. Cl.
CPC .......... *H01M 4/0404* (2013.01); *H01M 4/668* (2013.01); *Y10T 29/49204* (2015.01)

(58) Field of Classification Search
CPC .. H01M 4/0404; H01M 4/139; H01M 10/058; H01M 4/04; Y10T 29/49204
USPC .............................. 29/874, 623.1, 623.3, 746
See application file for complete search history.

(56) References Cited

U.S. PATENT DOCUMENTS 11,588,147 B2 *  2/2023 Masuzawa .......... H01M 50/461

2007/0072083 A1 *  3/2007 Ikuta ..................... H01G 11/50
                                                        429/231.95
2019/0299598 A1    10/2019 Yokota
(Continued)

FOREIGN PATENT DOCUMENTS

| EP | 3753736 | 12/2020 |
|---|---|---|
| JP | 2018065111 | 4/2018 |
| JP | 2019-061943 | 4/2019 |

(Continued)

OTHER PUBLICATIONS

Extended European Search Report for 22182207.5 mailed on Nov. 17, 2022.

(Continued)

*Primary Examiner* — Thiem D Phan
(74) *Attorney, Agent, or Firm* — IPUSA, PLLC

(57) ABSTRACT

An electrode manufacturing apparatus according to one aspect of the present disclosure is configured to discharge a liquid to form a resin layer or an inorganic layer on an electrode substrate which is being conveyed in a predetermined direction. The electrode manufacturing apparatus includes a detector, a liquid discharger provided downstream of the detector in the predetermined direction and configured to discharge the liquid to form the resin layer or the inorganic layer, and a controller configured to control a discharge condition of the liquid discharger. Points where a property varies are present on the electrode substrate along a direction intersecting the predetermined direction. The detector outputs pieces of detection information obtained by detecting one of the points in time series, and the controller controls the discharge condition of the liquid discharger based on combined detection information obtained by combining the pieces of detection information.

15 Claims, 27 Drawing Sheets

(56) References Cited

U.S. PATENT DOCUMENTS

2020/0119333 A1   4/2020   Masuzawa et al.
2021/0075916 A1   3/2021   Miyakoshi et al.

FOREIGN PATENT DOCUMENTS

KR   10-2019-0113912   10/2019
WO      2018/164076    9/2018

OTHER PUBLICATIONS

Office Action dated Sep. 9, 2024 issued with respect to the corresponding Korean Patent Application No. 10-2022-0086367.

* cited by examiner

FIG.1
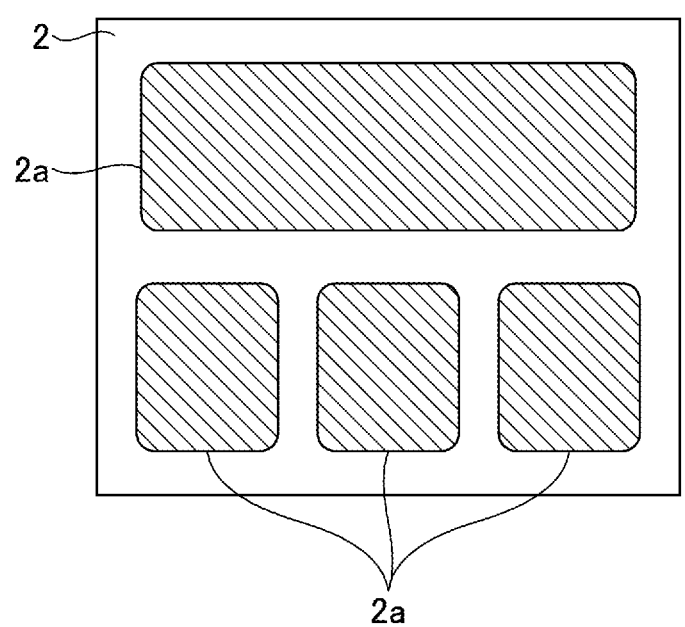
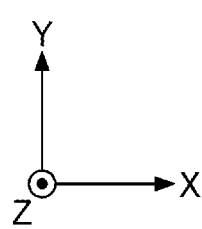

FIG.2
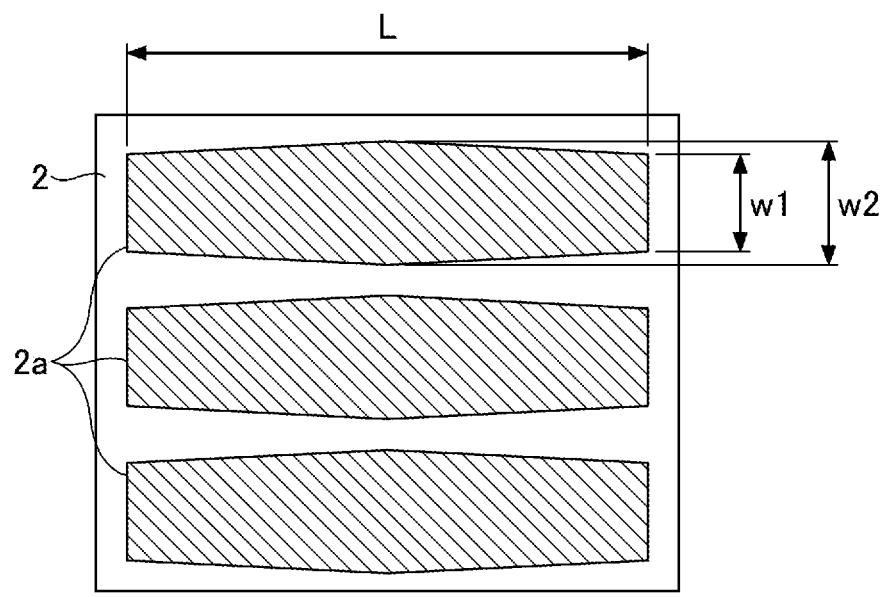
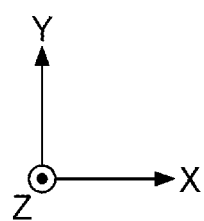

FIG.4
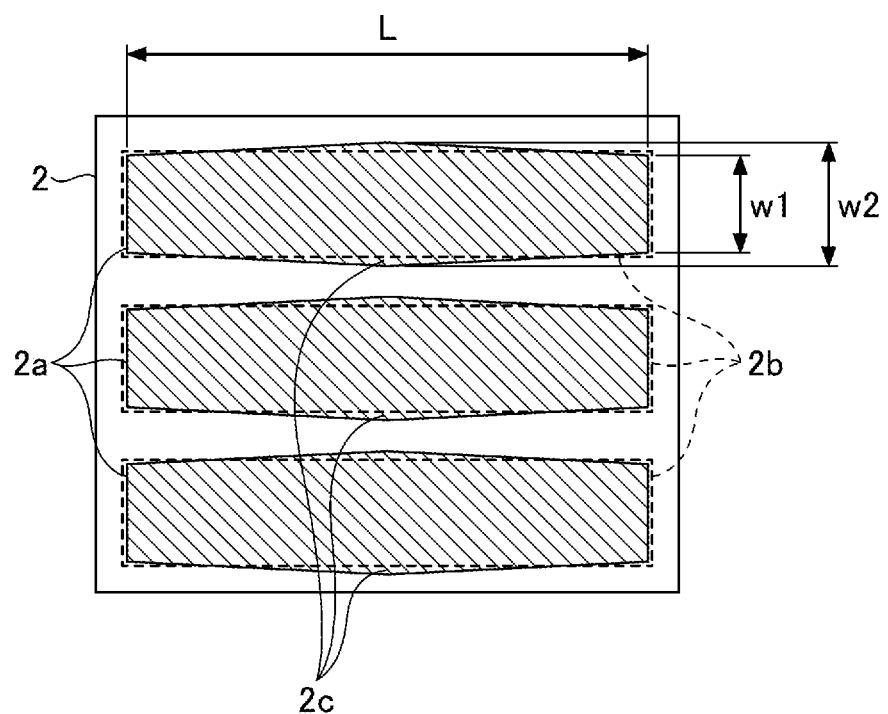
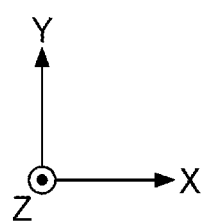

FIG.10
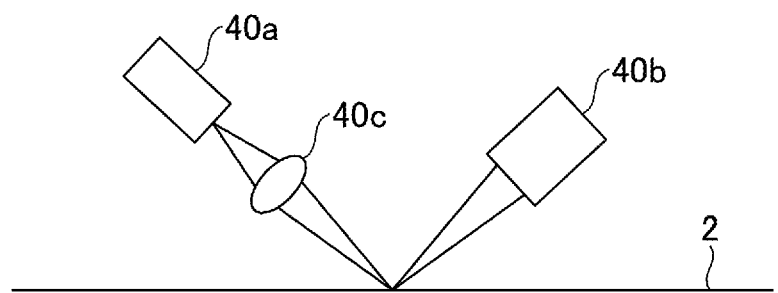
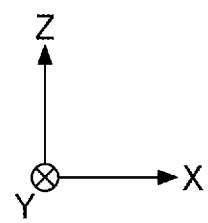

FIG.19
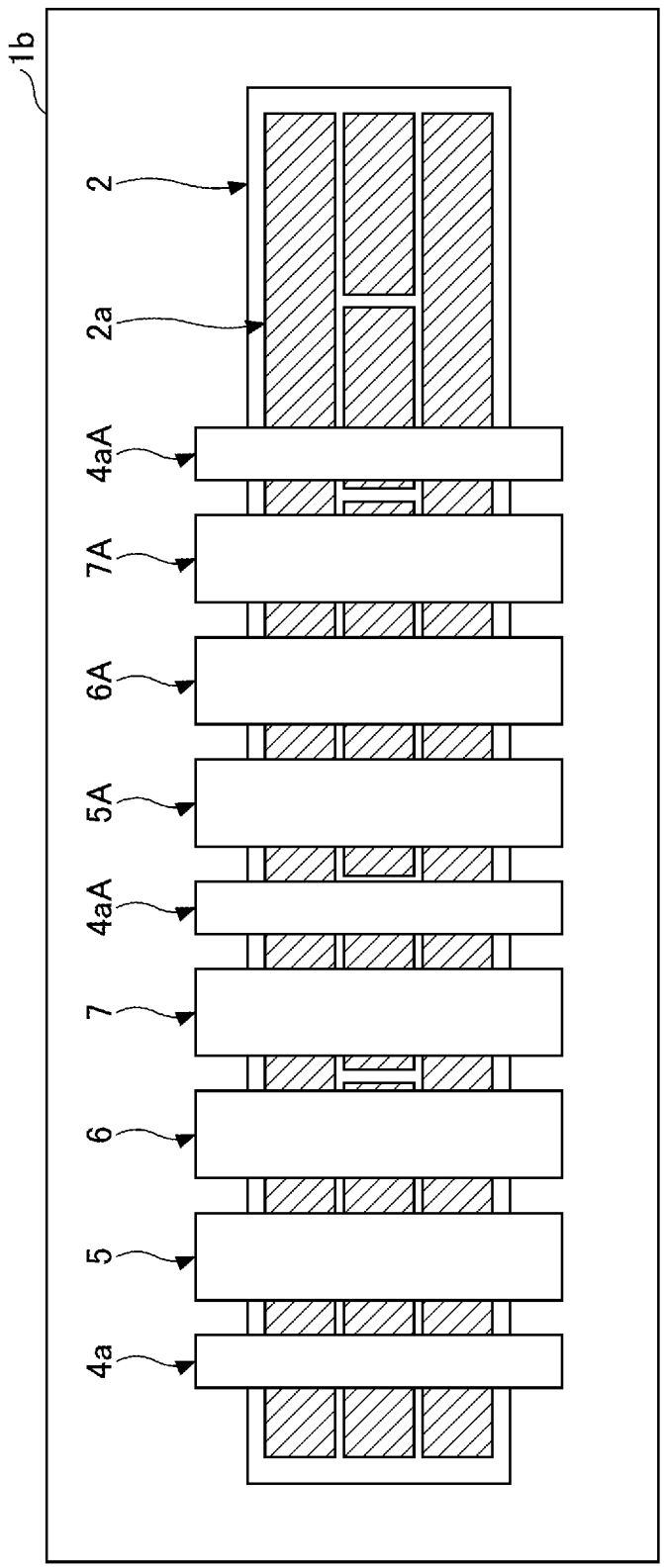
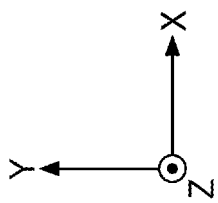

FIG.22
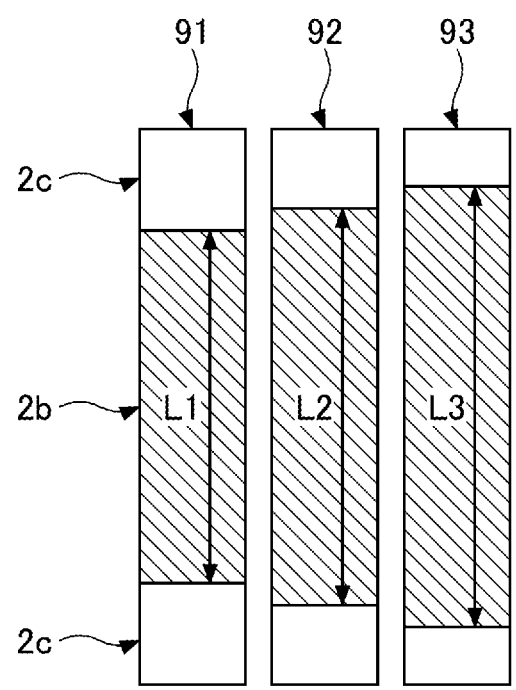
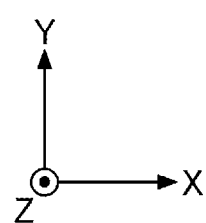

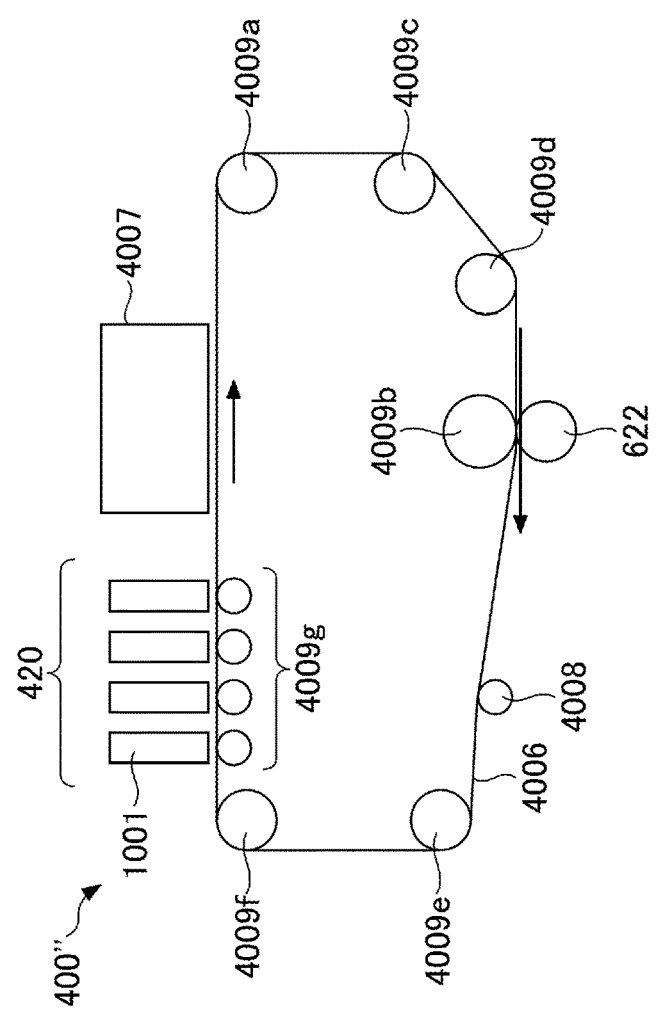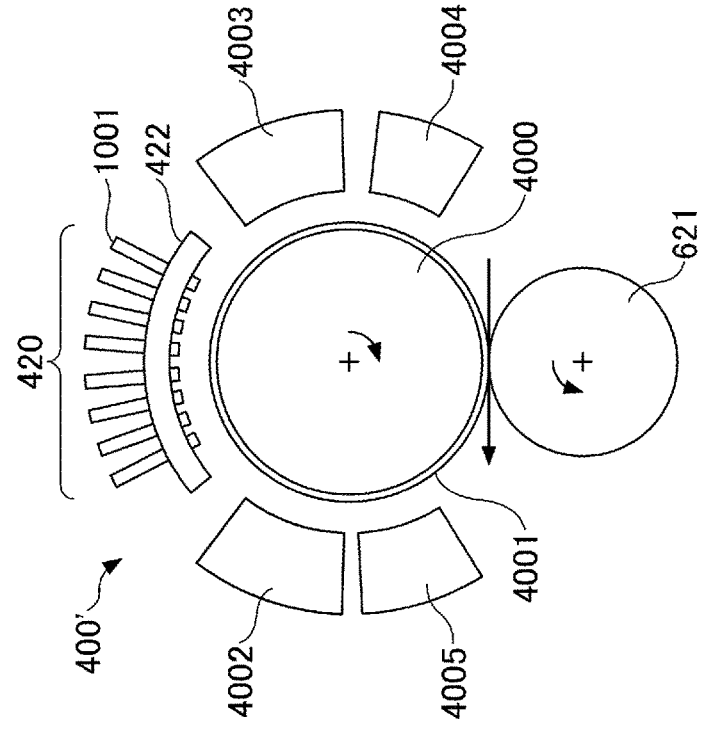

LONG DIRECTION
OF NOZZLE PLATE

SHORT DIRECTION
OF NOZZLE PLATE

LIQUID DISCHARGE
DIRECTION

ELECTRODE MANUFACTURING METHOD

CROSS-REFERENCE TO RELATED APPLICATION

The present application claims priority under 35 U.S.C. § 119 to Japanese Patent Application No. 2021-118051, filed Jul. 16, 2021, and Japanese Patent Application No. 2022-88736, filed May 31, 2022. The contents of these applications are incorporated herein by reference in their entirety.

BACKGROUND OF THE INVENTION

1. Field of the Invention

The disclosure herein generally relates to an electrode manufacturing apparatus, an energy storage device manufacturing apparatus, a liquid discharge apparatus, an electrode manufacturing method, and a non-transitory recording medium.

2. Description of the Related Art

As a related art, there is known a liquid discharge apparatus for discharging a liquid onto a liquid discharge target which is being conveyed in a predetermined direction.

As such a liquid discharge apparatus, there is disclosed an apparatus that includes a droplet nozzle unit which discharges droplets to film formation areas formed at regular intervals in a predetermined direction on a belt member extending along the predetermined direction (see, for example, Patent Document 1).

Patent Document 1: Japanese Unexamined Patent Application Publication No. 2018-65111

SUMMARY OF THE INVENTION

An electrode manufacturing apparatus according to one aspect of the present disclosure is an electrode manufacturing apparatus for discharging a liquid to form a resin layer or an inorganic layer on an electrode substrate which is being conveyed in a predetermined direction. The electrode manufacturing apparatus includes a detector, a liquid discharger provided on a downstream side of the detector in the predetermined direction and configured to discharge the liquid to form the resin layer or the inorganic layer, and a controller configured to control a discharge condition of the liquid discharger, wherein a plurality of points where a property varies are present on the electrode substrate along a direction intersecting the predetermined direction, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information.

BRIEF DESCRIPTION OF THE DRAWINGS

FIG. 1 is a plan view illustrating the first example of electrode composition layer portions;

FIG. 2 is a plan view illustrating the second example of the electrode composition layer portions;

FIG. 4 is a view illustrating the second example of the resin layer portions formed on the electrode composition layer portions;

FIG. 10 is a side view illustrating an example of the arrangement of an optical sensor included in the detector;

FIG. 19 is a plan view illustrating an example of the arrangement of an electrode printing apparatus according to the third embodiment;

FIG. 22 is a view illustrating an example of a plurality of pieces of image data.

FIG. 24A is a view illustrating an example of the arrangement of a printing unit that uses an intermediate transfer drum to perform printing by employing a transfer printing method;

FIG. 24B is a view illustrating an example of the arrangement of a printing unit that uses an endless intermediate transfer belt to perform printing by employing the transfer printing method;

DESCRIPTION OF THE EMBODIMENTS

Figure 3:
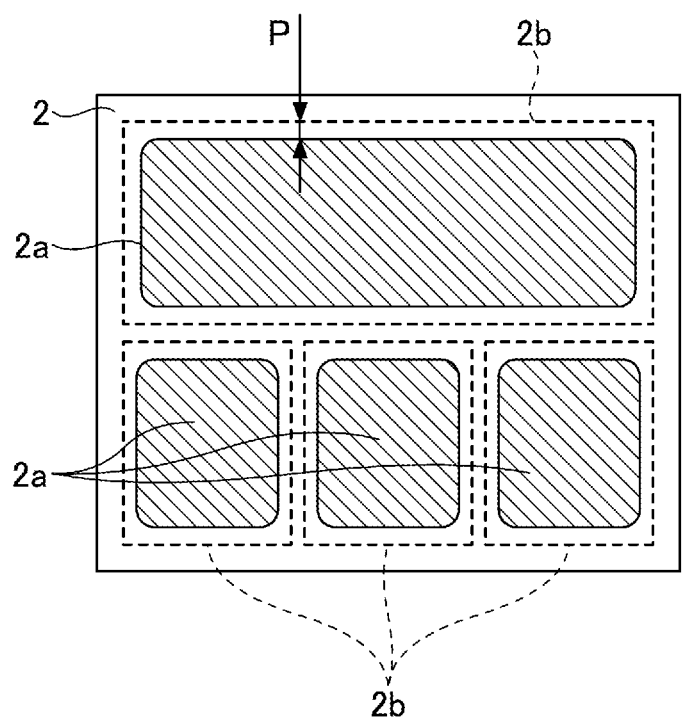
FIG. 3 is a view illustrating the first example of resin layer portions formed on the electrode composition layer portions.

The present disclosure has an object to allow a liquid discharge operation by a liquid discharger to be controlled in accordance with the changes in a liquid discharge target.

Embodiments of the present disclosure will be described hereinafter with reference to the accompanying drawings. The same reference numerals will denote the same components throughout the drawings, and a repetitive description thereof will be omitted.

The embodiments described below present an electrode manufacturing apparatus, an energy storage device manufacturing apparatus, a liquid discharge apparatus, an electrode manufacturing method, and a non-transitory recording medium as examples for embodying the technical idea of the present disclosure, and are not intended to limit the present disclosure. The dimensions, the materials, the shapes, the relative arrangements, and the like of the components described below are intended to be exemplary and are not intended to limit the scope of the present disclosure unless otherwise specified. Furthermore, the sizes and the positional relationships of members illustrated in the drawings may be exaggerated for the purposes of clarification.

Each embodiment describes an electrode printing apparatus as an example of an electrode manufacturing apparatus and as an example of a liquid discharge apparatus. The electrode printing apparatus is an apparatus that uses a liquid composition, which can form a resin layer portion (resin layer) or an inorganic layer portion (inorganic layer), to form resin layer portions (resin layer) or inorganic layer portions (inorganic layer) to cover the respective surfaces of electrode composition layer portions formed on the surface of a current collector. An electrode substrate that includes the current collector, which has the electrode composition layer portions (electrode composition layer) formed thereon, corresponds to a liquid discharge target. An electrode composition layer portion corresponds to a first film area, and a resin layer portion or an inorganic layer portion corresponds to a second film area. Note that discharging a liquid to form a resin layer portion (resin layer) or an inorganic layer portion (inorganic layer) on an electrode substrate includes not only cases where the resin layer portion or the inorganic layer portion is formed on the electrode substrate by performing a liquid discharge process alone, but also cases where a liquid discharge process is performed to form a precursor and a post-process (for example, heat treatment or the like) is subsequently performed on the precursor to form the resin layer portion or the inorganic layer portion.

According to the disclosures, the liquid discharge operation by a liquid discharger can be controlled in accordance with the changes in a liquid discharge target.

(Current Collector)

A current collector according to the embodiments is a piece of conductive foil that has planarity and can be suitably used for secondary cells and capacitors, which are generally used as energy storage devices. The current collector is particularly suitable for use in a lithium-ion secondary battery. Aluminum foil, copper foil, stainless-steel foil, titanium foil, etched foil in which fine holes have been formed by etching one of these pieces of foil, porous current collectors used in lithium-ion capacitors, or the like can be used as the conductive foil. A current collector obtained by flattening a carbon paper or carbon fiber electrode, which is used in power generating devices such as fuel cells, into a non-woven or woven material can be used as the current collector. Alternatively, among the porous current collectors mentioned above, a substrate that includes fine holes can be used as the electrode substrate.

(Electrode Composition Layer Portions)

Each electrode composition layer portion (electrode composition layer) according to the embodiments is a layer portion which includes an active substance arranged on the current collector. The electrode composition layer portion is formed by dispersing a powdery active substance or dissolving a catalyst compound into a liquid, coating the electrode substrate with the liquid, and fixing and drying the liquid on the electrode substrate. An application process using a sprayer, a dispenser, a die coater, a dip coater, or the like is performed to form the electrode composition layer portion. The formation of the electrode composition layer portion is completed when the drying process finishes after the application process.

Furthermore, the shape of the electrode can be changed freely if the electrode composition layer portion is to be formed by on-demand printing such as electrophotographic printing, liquid electrophotography, or the like. In addition, if the current collector is also a piece of thin conductive foil such as aluminum foil, contactless printing can be performed by controlling the position of a specific pattern. Hence, it may be preferable to perform printing by employing an inkjet method using a liquid discharge head or a liquid discharge method using a dispenser, a jet nozzle, or the like, and it may be particularly preferable to employ the inkjet method.

Any given material may be used as a cathode active material as long as it is a material capable of reversibly intercalating and de-intercalating alkali metal ions. Typically, an alkali-metal containing transition metal compound can be used as a cathode active material. A lithium-containing transition metal compound, for example, a complex oxide containing lithium and at least one element selected from a group consisting of cobalt, manganese, nickel, chrome, iron, and vanadium can be used as a cathode active material. Other examples of cathode active materials are lithium-containing transition metal compounds such as lithium cobalt oxide, lithium nickel oxide, and lithium manganese oxide, olivine lithium salt such as $LiFePO_4$, chalcogenides such as titanium disulfide and molybdenum disulfide, manganese dioxides, and the like.

A lithium-containing transition metal compound is a metal oxide containing lithium and a transition metal or a metal oxide in which a portion of the transition metal in the metal oxide has been substituted by a different element. Examples of heterogenous elements are Na, Mg, Se, Y, Mn, Fe, Co, Ni, Cu, Zn, Al, Cr, Pb, Sb, B, and the like. Mn, Al, Co, Ni, and Mg are particularly preferred. A single heterogenous element or two or more different elements may be used. It is possible to use a single cathode active material or a combination of two or more cathode active materials. Nickel hydroxide or the like is an example of an active material that can be used in a nickel-hydrogen battery.

Any given material may be used as an anode active material as long as it is a material capable of reversibly intercalating and de-intercalating alkali metal ions. Typically, a carbon material containing graphite which has a crystal structure can be used as an anode active material. Examples of such carbon materials are natural graphite, spherical or fibrous synthetic graphite, non-graphitizable carbon (hard carbon), graphitizable carbon (soft carbon), and the like. Lithium titanate is an example of a material which can be used as an anode active material other than carbon materials. Using a high-capacity material such as silicon, tin, silicon alloy, tin alloy, silicon oxide, silicon nitride, tin oxide, or the like as an anode active material may be preferable to increase the energy density of a lithium-ion battery.

An example of an active material for a nickel-hydrogen battery is a hydrogen-absorbing alloy such an AB2 type or A2B type hydrogen-absorbing alloy represented by Zr—Ti—Mn—Fe—Ag—V—Al—W, Ti15Zr21V15Ni29Cr5Co5Fe1Mn8, or the like.

As a cathode binder or an anode binder, for example, PVDF, polytetrafluoroethylene (PTFE), polyethylene, polypropylene, aramid resin, polyamide, polyimide, polyamide-imide, polyacrylonitrile, polyacrylic acid, polyacrylic acid methyl ester, poly acrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoro polypropylene, styrene butadiene rubber, carboxymethyl cellulose and the like may be used. Alternatively, a copolymer made from two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethylvinylether, acrylic acid, hexadiene may be used as the cathode binder or the anode binder. In addition, two or more materials selected among these materials may be mixed and used.

Examples of a conductive agent to be included in the electrode are graphites such as natural graphite and synthetic graphite, carbon blacks such as acetylene black, ketjen black, channel black, furnace black, lamp black, thermal black and the like, conductive fibers such as carbon fiber, metal fiber and the like, metal powders such as carbon fluoride and aluminum, conductive whiskers such as zinc oxide and potassium titanate, conductive metal oxides such as titanium oxide, and conductive organic materials such as phenylene derivatives, graphene derivatives, and the like.

In general, as an active material in a fuel cell, a catalyst which is obtained as a catalyst of a cathode electrode and an anode electrode by allowing a catalyst carrier such as carbon to carry fine metal particles such as platinum, ruthenium, a platinum alloy, or the like can be used. To allow catalyst particles to be carried on the surface of the catalyst carrier, for example, the catalyst carrier is suspended in water, a precursor of the catalyst particles is added and dissolved in a suspension (containing alloy components such as chloroplatinic acid, dinitrodiamino platinum, platinum(II) chloride, platinum chloride, bisacetylacetonatoplatinum, dichlorodiammine platinum, dichlorotetramine platinum, platinum (II) sulfate ruthenium chloride iridic acid chloride, chlorinated rhodium acid, chloride diiron, cobalt chloride, chromium chloride, gold chloride, silver nitrate, rhodium nitrate, palladium chloride, nickel nitrate, iron sulfate, copper chloride), and an alkali is added to produce a metal hydroxide and a catalyst carrier carrying the metal hydroxide on the surface of the catalyst carrier. Such a catalyst carrier is applied on an electrode and reduced in a hydrogen atmosphere or the like to obtain an electrode coated with catalyst particles (active material) on the surface.

(Electrode Substrate)

An electrode substrate according to the embodiments includes a current collector and electrode composition layer portions on the current collector.

(Resin Layer Portions or Inorganic Layer Portions)

Resin layer portions (resin layer) or inorganic layer portions (inorganic layer) are layer portions that are formed by using a liquid discharge head to discharge a liquid composition onto the electrode composition layer portions formed on the electrode substrate. The resin layer portions or the inorganic layer portions physically insulate the electrodes from each other when the electrodes are ultimately made into an energy storage device. Resin layer portions or inorganic layer portions may be formed first in a desired electrode pattern, such as an insulating frame, on the current collector by employing a coating method which has a relatively high precision, for example, screen printing, a gravure coating, inkjet coating, dispenser drawing, or the like. The resin layer portions or the inorganic layer portions are formed in this case. Subsequently, a slurry of the active material is applied onto the pattern and the resulting product is dried. Accordingly, even in a case where the formation rate of the active material layer is to be increased greatly or in a case where a relatively thick film is to be formed from a slurry having a limited viscosity, it may be possible to create a state where an active material of a desired size is in constant contact with the current collector in the subsequent drying process. As a result, the desired coating dimension can be achieved constantly.

Accordingly, the resin layer portions or the inorganic layer portions may have a property that will allow them to be accurately applied and dried on the current collector, and a property that will prevent reaction or dissolution in the above-described active material and in an electrolyte solution to be used in when a device is ultimately made. That is, a resin layer portion or an inorganic layer portion on the periphery of an electrode composition layer portion is an insulating film. Typically, an insulating film may have an insulating property on the order of mega ohm/cm or more in a thickness direction. In addition, since the insulating property is to be maintained for a long time in the device, it is also preferable for the insulating film be insoluble in the electrolyte solution. Hence, as it is difficult to achieve these properties with only a resin dissolved in a typical organic solvent, it may be preferable to use a resin belonging to resins that acquire a non-cross-linking property in response to application of heat or ionizing radiation after the coating process. Alternatively, fine particles having an insulating property can be used as the inorganic material. The fine particles can be dispersed in a solvent, and a film with insulating property can be obtained after the coating and drying processes. The inorganic material may also be a solid-state electrolyte material or a quasi solid-state electrolyte material. Furthermore, since the resin layer portion or the inorganic layer portion can undergo a pressing process at a linear pressure of approximately 250 kN maximum during electrode fabrication, it may be preferable for the resin layer portion or the inorganic layer portion to have resistance against linear pressure.

Next, a liquid composition for forming the resin layer portion will be described first. This liquid composition, which is to be used for forming the above-described resin layer portion, is obtained by dissolving at least one of a resin or a precursor of the resin (a resin or a precursor of the resin) in a liquid.

As such a resin and a precursor of the resin, it is preferable to use those obtained by dissolving, in an organic solvent as the liquid, a resin or an oligomer whose molecule will have a cross-linking structure upon application of ionizing radiation or infrared light (heat). As such a resin and a precursor of the resin, it is preferable to use a low molecular weight oligomer precursor of a polyimide resin, a polyester resin, a polyamide resin, a polyolefin resin, or an acrylic resin or to use a polyimide resin, a polyester resin, a polyamide resin, a polyolefin resin, or an acrylic resin which has been partially modified with a hydrocarbon group having an aliphatic unsaturated bond. For example, a resin and a precursor having an unsaturated bond such as an allyl group, an allyloxy group, an acryloyl group, a butenyl group, a cinnamyl group, a cinnamoyl group, a crotaloyl group, a cyclohexadienyl group, an inpropenyl group, a methacryloyl group, a pentenyl group, a propenyl group, a styryl group, a vinyl group, a butadienyl group, and the like on a part of the side chain of an acrylic copolymer are preferable.

Furthermore, polybutylene terephthalate, polyethylene terephthalate, polyacrylonitrile, polyvinylidene fluoride, polyether ketone, polyethylene naphthalate, polysulfone, polyimide, polyester, polypropylene, polyoxymethylene, polyamide, polyvinyl pyrrolidone, cellulose, and the like, the insolubility and the cross-linking property of the resin layer portion or the inorganic layer portion after the fixing process can also be improved by using cellulose nanofiber or a relatively low molecular weight dispersion precursor whose molecular weight is 10,000 or less and heating the resin layer portion or the inorganic layer portion the with ionizing radiation or infrared light.

In addition, to improve the crosslinkability of these precursors, the precursors may contain a maximum of approximately 30 parts by weight of azide compounds. Examples of azide compounds include 3,3'-dichloro-4,4'-diazidodiphenylmethane, 4,4'-diazidodiphenyl ether, 4,4'-diazidodiphenyl disulfide, 4,4'-diazidodiphenyl sulfide, 4,4'-diazidodiphenylsulfone, 4-azidochalcone, 4-azido-4'-hydroxychalcone, 4-azido-4'-methoxychalcone, 4-azido-4'-morpholinochalcone, 4-dimethylamino-4'-azidochalcone, 2,6-bis(4'-azidobenzal)-4-methylcyclohexanone, 2,6-bis(4'-azidobenzal)-cyclohexanone, cinnamylidene-4-azidoacetophenone, 4-azidocinnamylidene acetophenone, 4-azido-4'-dimethylaminocinnamylidene acetophenone, cinnamylidene-4-azidocinnamylidene acetone, 2,6-bis(4'-azidocinnamylidene)-4-methylcyclohexanone, 2,6-bis(4'-azidocinnamylidene)-cyclohexanone, 1,4'-azidobenzylidene indene, 1,4'-azidobenzylidene indene, 1,4'-azidobenzylidene-3-α-hydroxy-4"-azidobenzylindene, 9,4'-azidobenzylidenefluorene, 9,4'-azido cinnamylidene fluorene, 4,4'-diazidostilbene-2,2'-disulfonyl-N-(p-methoxyphenyl) amide, 4,4'-diazidostilbene-2,2'-disulfonyl-N-(p-hydroxyethylphenyl)amide, 4,4'-diazidostilbene-2,2'-disulfonyl-N-(p-hydroxyphenyl)amide, 4,4'-diazidostilbene-2,2'-disulfonylamide, 4,4'-diazidobenzophenone, 4,4'-diazidostilbene, 4,4'-diazidochalcone, 4,4'-diazidobenzalacetone, 6-azido-2-(4'-azidostyryl) benzimidazole, 3-azidobenzylideneaniline-N-oxy-p(4-azidobenzylideneamido)benzoic acid, 1,4-bis(3'-azi-1-zeta-styryl)benzene, 3,3'-diazidodiphenylsulfone, and 4,4'-diazidodiphenylmethane.

Among these, in particular, 2.6-bis-(4'-azidobenzal)-4-methylcyclohexanone and the like may be suitably used. Although the solvent for dissolving these materials is not particularly limited, a solvent that can dissolve the above-described compounds and has a boiling point and surface tension suitable for the subsequent coating and drying processes can be used alone or a mixture of such solvents can be adjusted and used.

Furthermore, a resin layer portion or an inorganic layer portion may be formed first around (on the frame area of) each area where an electrode composition layer portion is to be formed on the current collector, and the current collector which has the resin layer portion or the inorganic layer portion formed on each frame area may be coated with a slurry of active material and dried. As a result, even in a case in which the formation rate of the electrode composition layer portion is increased greatly or in a case in which a relatively thick film is to be formed from a slurry with limited viscosity, it can set a state in which an active material of a desired size and width is in constant contact with the current collector in the subsequent drying process. Since the desired coating dimensions can be constantly achieved, the preferred resin layer portions or inorganic layer portions can be formed. Hence, it can be preferable for the resin layer portions or the inorganic layer portions to have a property for accurate application and drying on the current collector and a property for preventing dissolution in the active material or the electrolyte solution to be used when a device is ultimately made. That is, the resin layer portion or the inorganic layer portion arranged in the periphery of each electrode composition layer portion is an insulating film.

(Example of Electrode Composition Layer Portions Formed on Current Collector)

FIGS. 1 and 2 are views illustrating examples of electrode composition layer portions 2a formed on a current collector 2. FIG. 1 illustrates the first example, and FIG. 2 illustrates the second example. As illustrated in FIG. 1, three electrode composition layer portions 2a, each having an approximately rectangular shape in a plan view, that is, when viewed from the +Z direction, and one electrode composition layer portion 2a, having a rectangular shape whose lengthwise direction is the X direction in the plan view, are formed on the current collector 2. The shapes of the electrode composition layer portions 2a can be appropriately set in accordance with the purpose. The shapes of the electrode composition layer portions 2a in the plan view correspond to a predetermined pattern. In other words, the electrode composition layer portions 2a (first film areas) are arranged in a predetermined pattern which is already formed on the current collector 2.

The positional accuracy of the coating process for forming the electrode composition layer portions 2a by a spray or a die coater is at best approximately a few hundred μm. Hence, the positions of the electrode composition layer portions 2a on the current collector 2 may shift from the desired positions.

FIG. 2 illustrates the shift in the positions of the electrode composition layer portions 2a. Although each of the three electrode composition layer portions 2a illustrated in FIG. 2 should ideally have a rectangular shape whose lengthwise direction is the X direction in the plan view, the shift in the positions has caused the width of each electrode composition layer portion 2a to deviate in the range from a width w1 to a width w2 in the Y direction. For example, if a length L of each electrode composition layer portion 2a is 2,000.0 mm in the X direction, the difference between the width w1 and the width w2 is approximately 1.0 mm.

(Example of Resin Layer Portion or Inorganic Layer Portion Formed on Electrode Composition Layer Portion)

FIGS. 3 and 4 are views illustrating examples of resin layer portions 2b formed on the electrode composition layer portions 2a. FIG. 3 illustrates the first example, and FIG. 4 illustrates the second example. Note that the resin layer portion and the inorganic layer portion can be handled in the same manner. Therefore, excluding cases which require particular discrimination, the term "resin layer portion 2b" will collectively denote the resin layer portion and the inorganic layer portion for the sake of descriptive convenience.

In FIG. 3, the electrode composition layer portions 2a are formed at predetermined positions on the current collector 2 in a predetermined pattern. Hence, by forming the resin layer portions 2b at predetermined positions in accordance with the predetermined pattern, the resin layer portions 2b indicated by broken lines can cover the corresponding electrode composition layer portions 2a. As a result, the resin layer portion 2b can suitably demonstrate its insulating effect and the like.

Note that a width P of protrusion in FIG. 3 represents a width in which each resin layer portion 2b protrudes from the corresponding electrode composition layer portion 2a in the Y direction. Forming the resin layer portion 2b on each electrode composition layer portion 2a by setting such a width of protrusion can allow the electrode composition layer portion 2a to be reliably covered by the resin layer portion 2b. A width of protrusion can also be provided in a similar manner in the X direction.

In FIG. 4, the electrode composition layer portions 2a have shifted from the predetermined pattern on the current collector 2. Hence, if the resin layer portions 2b are formed in accordance with the predetermined pattern, uncovered areas 2c that are not covered by the resin layer portions 2b may be formed on the electrode composition layer portion 2a in accordance with the shift in the respective positions of the electrode composition layer portions 2a. As a result, a defect such as a short circuit or the like may occur in the uncovered areas 2c.

If each resin layer portion 2b is formed to cover an area larger than the corresponding electrode composition layer portion 2a in consideration of the effect of the shift on the position of the electrode composition layer portion 2a, an unnecessarily large area of the current collector 2 may be covered by the resin layer portions 2b. As a result, the area of the current collector 2 may not be able to be used effectively when a conductive area is cut out from the current collector 2 and used.

Therefore, there is a need to allow the respective positions where the resin layer portions 2b are formed to be controlled by controlling the liquid discharge operation by a liquid discharger in accordance with the changes in the positions and the patterns of the electrode composition layer portions 2a on the current collector 2.

The electrode printing apparatus according to the embodiments to be described hereinafter can answer, for example, such a need.

Note that the X-axis, the Y-axis, and the Z-axis may be used to indicate the respective directions in the drawings to be presented below. Assume that the X direction taken along the X-axis indicates a direction in which the electrode printing apparatus will convey the electrode substrate. Assume also that the Y direction taken along the Y-axis indicates a direction perpendicular to the X direction on the electrode substrate, and that the Z direction taken along the Z-axis indicates a direction perpendicular to both the X direction and the Y direction. The X direction is an example of a predetermined direction, and the Y direction is an example of a direction intersecting the predetermined direction.

A direction in which an arrow is oriented in the X direction denotes the +X direction or the +X side, and a direction in the opposite direction of the +X direction is denoted as the −X direction or the −X side. In addition, a direction in which an arrow is oriented in the Y direction denotes the +Y direction or the +Y side, and a direction in the opposite direction of the +Y direction is denoted as the −Y direction or the −Y side. Furthermore, a direction in which an arrow is oriented in the Z direction denotes the +Z direction or the +Z side, and a direction in the opposite direction of the +Z direction is denoted as the −Z direction or the −Z side.

First Embodiment

<Example of Arrangement of Electrode Printing Apparatus 1>

Figure 5:
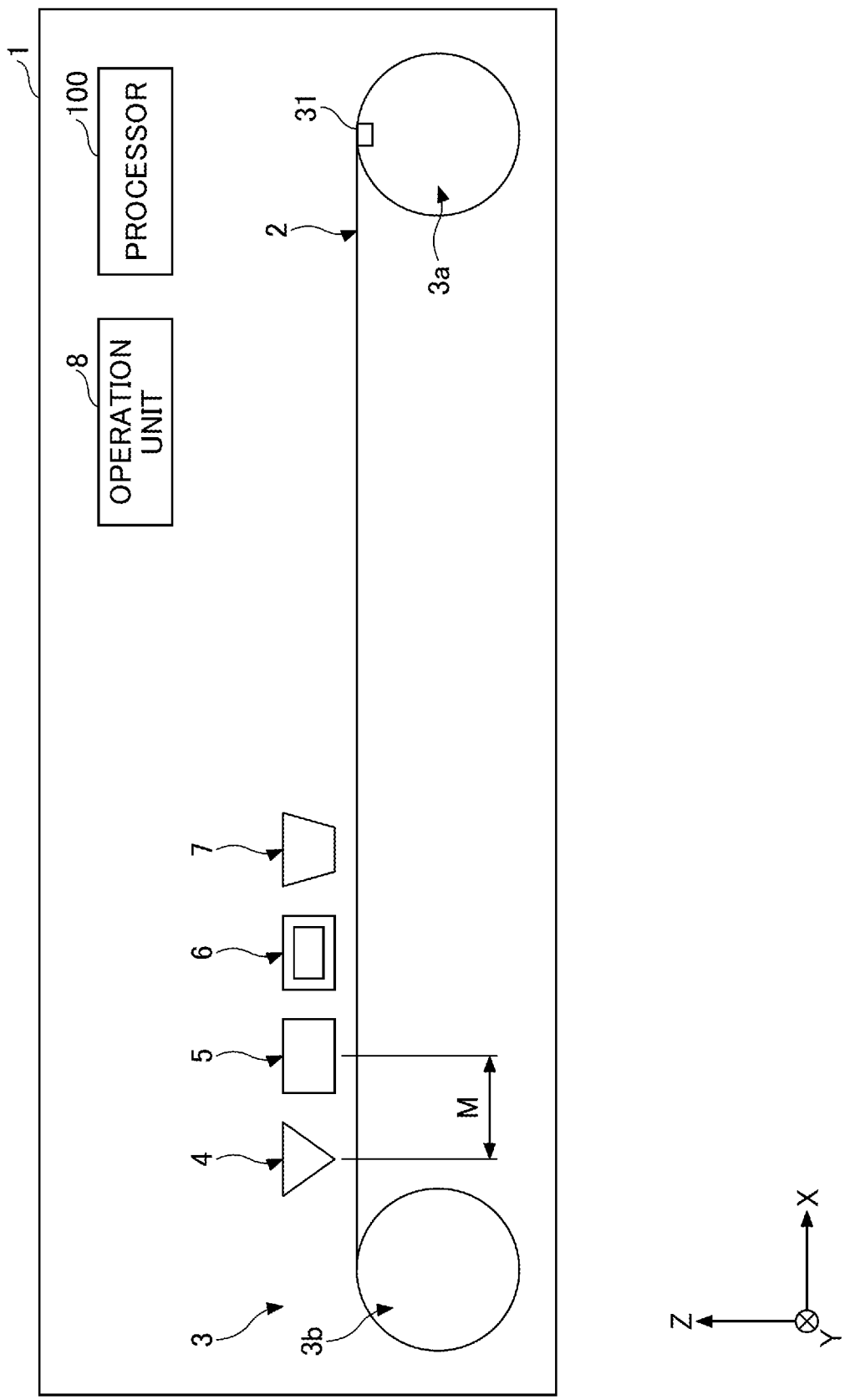
FIG. 5 is a side view illustrating an example of the arrangement of an electrode printing apparatus according to the first embodiment.
Figure 6:
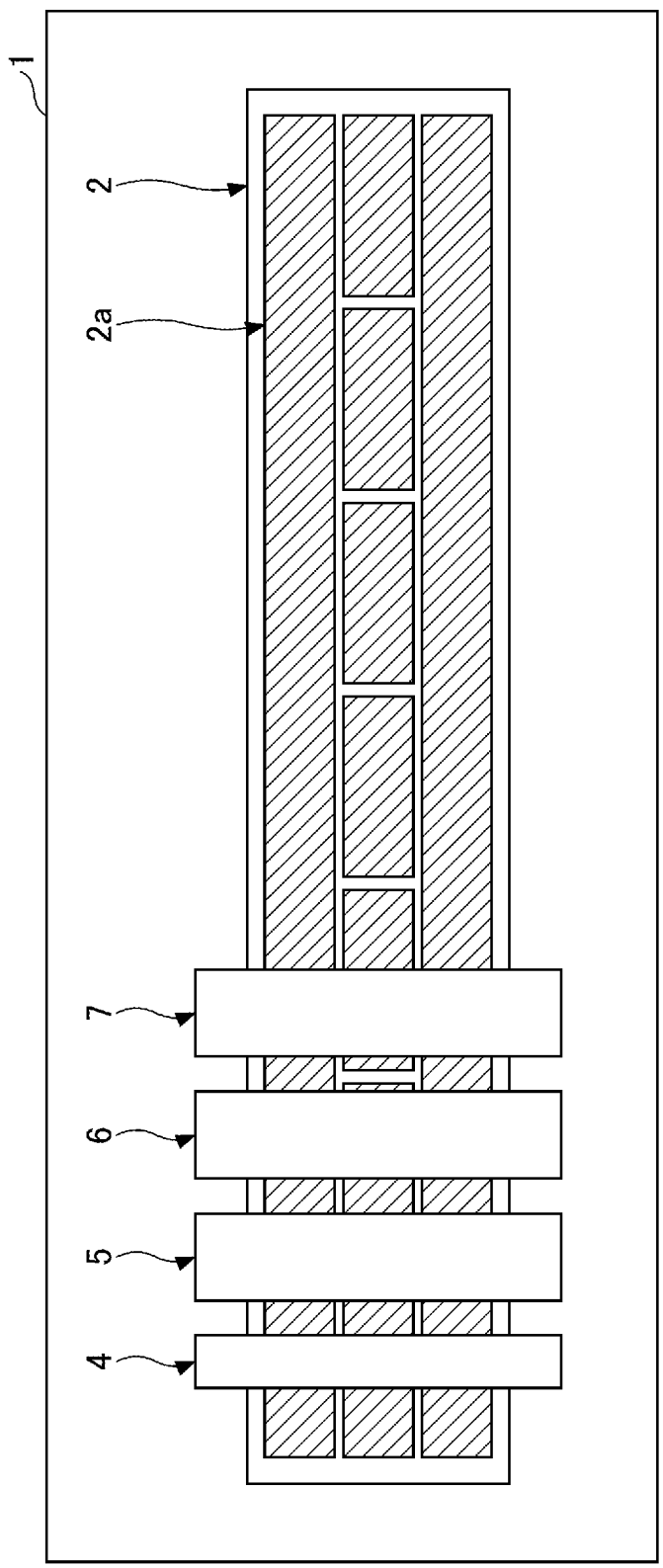
FIG. 6 is a plan view illustrating another example of the arrangement of the electrode printing apparatus according to the first embodiment.

The arrangement of an electrode printing apparatus 1 according to the first embodiment will be described with reference to FIGS. 5 and 6. FIGS. 5 and 6 are views each illustrating an example of the arrangement of the electrode printing apparatus 1. FIG. 5 is a side view of the electrode printing apparatus 1 taken from the −Y direction, and FIG. 6 is a plan view of the electrode printing apparatus 1 taken from the +Z direction.

The electrode printing apparatus 1 includes a detector 4, a liquid discharge head 5, and a processor 100. A conveyance mechanism 3 conveys, in the +X direction, the current collector 2 or the electrode substrate including the current collector 2 which has the electrode composition layer portions 2a formed thereon. The detector 4 and the liquid discharge head 5 are arranged in this order from the upstream side to the downstream side in the +X direction. In addition, a light source 6 and a heater 7 are arranged in this order on the downstream side of the liquid discharge head 5 in the +X direction.

The electrode printing apparatus 1 also includes an operation unit 8. The operation unit 8 is formed by a touch screen or the like. The operation unit 8 can receive an operation input that a user of the electrode printing apparatus 1 has performed on the electrode printing apparatus 1, and display the states and the settings of the electrode printing apparatus 1 on a screen.

The current collector 2 is a long sheet of conductive foil extending along the X direction. The conductive foil is, for example, copper foil. A plurality of points where properties vary are present along the Y direction intersecting the +X direction on the electrode substrate. The properties may be, for example, the thickness, the color, the reflectance, and the like of the electrode substrate. It may be suitable to include at least one of the thickness, the color, or the reflectance as such properties. More specifically, since the electrode composition layer portions 2a are formed on the current collector 2, at least one of the thickness, the color, the reflectance, or the like of each area where the electrode composition layer portion 2a is formed on the electrode substrate can differ from the corresponding one of the thickness, the color, the reflectance, or the like of an area where the electrode composition layer portion 2a is not formed on the electrode substrate. A point where the properties vary is a point at the boundary between an area where the electrode composition layer portion 2a is formed and an area where the electrode composition layer portion 2a is not formed.

The conveyance mechanism 3 conveys the electrode substrate so that the electrode substrate sequentially passes the detector 4, the liquid discharge head 5, the light source 6, and the front of the heater 7. The conveyance mechanism 3 includes a driving roller 3a, driven roller 3b, an encoder 31 for outputting a signal of the rotation angle of the driving roller 3a, and a motor driving the driving roller 3a. The electrode substrate is laid across and wound to at least the driving roller 3a and the driven roller 3b, and is conveyed in the +X direction in accordance with the rotation of the driving roller 3a. Note that the conveyance mechanism 3 may further include a guide member or the like to assist the movement of the electrode substrate.

The detector 4 is an example of a detector that detects, in time series, at least the above-described points where the properties vary on the electrode substrate to output a plurality of pieces of detection information. The electrode printing apparatus 1 can use the plurality of pieces of the detection information, which are output from the detector 4, to obtain the information about the position of each electrode composition layer portion 2a formed on the current collector 2. The detector 4 will be described in detail below with reference to FIGS. 9 to 12.

The liquid discharge head 5 is an example of a liquid discharger that discharges and applies the liquid composition onto the electrode composition layer portions 2a formed on the current collector 2 of the electrode substrate, which is conveyed in the +X direction, to form the resin layer portions 2b (resin layer) as liquid composition layer portions on the electrode substrate. The liquid discharge head 5 is installed in a position apart from the detector 4 by an installation distance M in the +X direction.

Based on image data as source data for forming each resin layer portion 2b and a piece of combined detection information which is obtained by combining the pieces of detection information acquired by the detector 4, the liquid discharge head 5 discharges the liquid composition to form a resin precursor layer portion as a precursor state of the resin layer portion 2b.

As the liquid discharge head 5, a linear head array having a width more than or equal to the width of the electrode substrate in the Y direction can be used. The driving method and a pressure generating unit for discharging the liquid composition from the liquid discharge head 5 are not particularly limited. For example, a thermal actuator that uses a pressure of steam generated by the heat of a heating element to propel droplets of the liquid composition, a piezoelectric actuator that uses mechanical pressure pulses generated by a piezoelectric element to propel droplets of the liquid composition, an electrostatic actuator formed by a diaphragm and a counter-electrode, or the like may be used. Furthermore, the liquid composition may be propelled by executing ON/OFF pressure control in a liquid composition supplying system accordingly.

The light source 6 irradiates, with light, each liquid composition layer portion formed on the electrode substrate to cure the liquid composition layer portion into the resin layer portion 2b. The light source 6 may be, for example, a mercury lamp such as a low-pressure mercury lamp, a medium-pressure mercury lamp, or a high-pressure mercury lamp, a tungsten lamp, an arc lamp, an excimer lamp, an excimer laser, a semiconductor laser, a high-power UV-LED, a YAG laser, a laser system combining a laser and a nonlinear optical crystal, a high-frequency induced ultraviolet radiation generator, an electron irradiation device such as an EB curing device, an X-ray irradiation device, or the like can be. Using a high-frequency induced UV generator, a high-pressure mercury lamp, a low-pressure mercury lamp, a semiconductor laser, or the like may be preferable in the viewpoint of system simplification. Further, the light source 6 may be provided with a focusing mirror or a scanning optical system.

An example of the light source 6 may be the LightHammer® Series manufactured by Heraeus Noblelight. Alternatively, high-luminance UV-LEDs or laser diodes of 1 W or more may be arrayed in a line or in a plane and used as the light source. Such high-luminance UV-LEDs, laser diodes, or the like are sold by an LED manufacture such as Nichia Corporation. Further, in a case where light has trouble reaching due to the light entering and being absorbed by the gaps between the particles of the active material powder, an electron or X-ray irradiation apparatus can be used as the light source. For example, a small electron beam irradiator by Iwasaki Electric CO., LTD. may be used.

The heater 7 heats resin precursor layer portions, which were formed by discharging the liquid composition for forming the resin layer portions on the electrode substrate, to promote the curing and drying of the resin precursor layer portions. For example, an infrared lamp, a roller (hot roller) incorporating a heating element, a blower which blows hot wind or hot air, a furnace incorporating hot air from a steam boiler, or the like may be used as the heater 7.

The heater 7 may be any device which is known to be a heat source and is controllable. That said, for example, if a device that can generate infrared light in addition to visible light is used as the light source 6, it may be possible to perform heating simultaneously with light irradiation. Employing such a device may favorably promote curing. Since each resin precursor layer portion is heated by the heat generated from the light source 6 when light is emitted on the resin precursor layer portion, it may be unnecessary to provide the heating unit as an independent member in the manner of the heater 7. However, it can take a long time for the resin precursor layer portions to be completely cured if the resin precursor layer portions are left at room temperature to be cured by only the heat from the light source 6. Hence, room-temperature curing may be suitable for application in cases where a sufficiently long time can be ensured for the resin precursor portions to be completely cured.

The processor 100 controls the operations of the conveyance mechanism 3, the detector 4, the liquid discharge head 5, the light source 6, the heater 7, and the like, and processes the plurality of pieces of the detection information output from the detector 4. As long as signals or data can be exchanged with the electrode printing apparatus 1, the processor 100 may be arranged inside or outside the electrode printing apparatus 1 or arranged in a remote location away from the electrode printing apparatus 1.

<Example of Arrangement of Processor 100>

Figure 7:
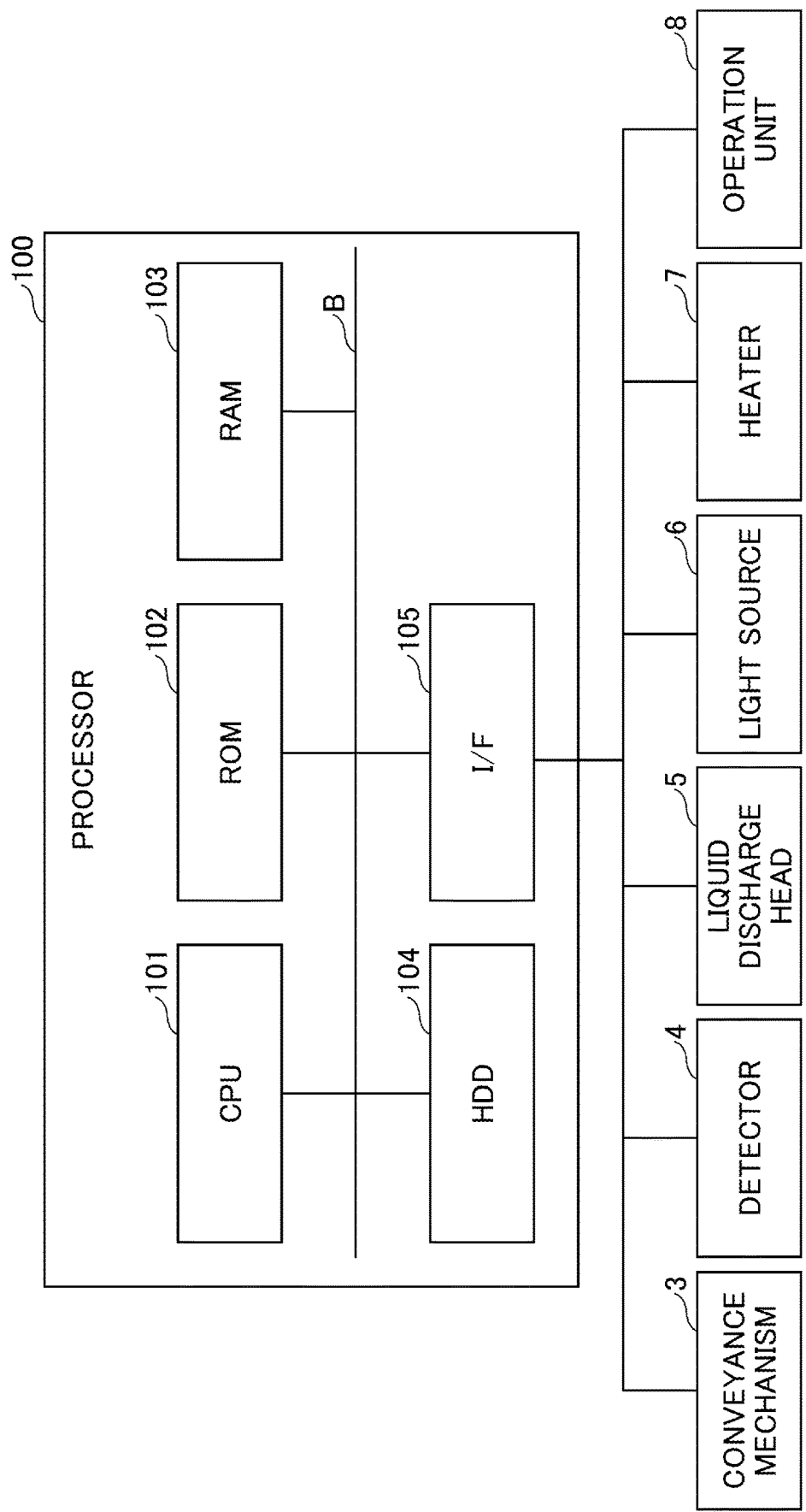
FIG. 7 is a block diagram illustrating an example of the hardware arrangement of a processor according to an embodiment.

FIG. 7 is a block diagram illustrating an example of the hardware arrangement of the processor 100. The processor 100 is constructed by a computer and includes a central processing unit (CPU) 101, a read-only memory (ROM) 102, a random-access memory (RAM) 103, a hard disk drive (HDD) 104, and an interface (I/F) 105. These components are electrically connected to each other via a system bus B.

The CPU 101 executes various kinds of arithmetic processing and control processing operations. The ROM 102 stores programs, such as an initial program loader (IPL) and the like, for driving the CPU 101. The RAM 103 is used as a work area of the CPU 101. The HDD 104 stores various types of data such as programs. The HDD 104 may be a solid-state drive (SSD) or the like.

The I/F 105 is an interface for connecting various kinds of external devices. In this case, the external devices are the conveyance mechanism 3, the detector 4, the liquid discharge head 5, the light source 6, the heater 7, the operation unit 8, and the like.

Figure 8:
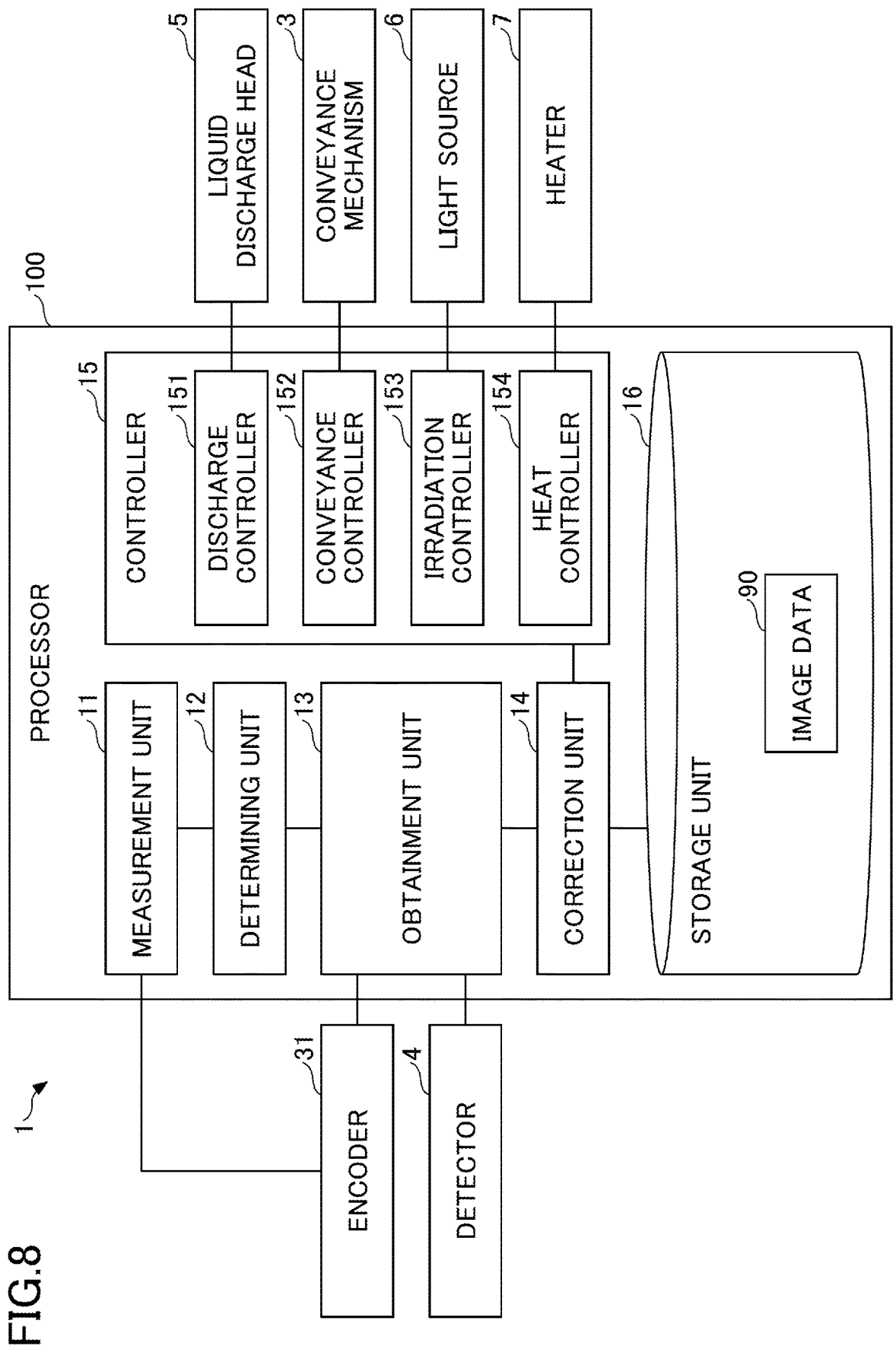
FIG. 8 is a block diagram illustrating an example of the functional arrangement of a processor according to the first embodiment.

FIG. 8 is a block diagram illustrating an example of the functional arrangement of the processor 100. The processor 100 includes, for example, a measurement unit 11, a determining unit 12, an obtainment unit 13, a correction unit 14, a controller 15, and a storage unit (storage device) 16. The controller 15 also includes a discharge controller 151, a conveyance controller 152, an irradiation controller 153, and a heat controller 154.

To implement the respective functions of the measurement unit 11, the determining unit 12, the obtainment unit 13, the correction unit 14, and the controller 15, the processor 100 causes the CPU 101 to execute programs loaded to the RAM 103 from the ROM 102, controls the I/F 105, or the like. Also, to implement the function of the storage unit 16, the processor 100 causes the CPU 101 to execute a program loaded to the RAM 103 from the ROM 102 to control the HDD 104 or the like.

In the embodiment, the processor 100 combines the plurality of pieces of detection information, which are output in time series from the detector 4, into a single piece of combined detection information, and controls the discharge conditions of the liquid discharge head 5 based on the obtained combined detection information.

The measurement unit 11 counts the clock signal of the CPU 101 to measure time and outputs a time measurement result to the obtainment unit 13. Alternatively, the measurement unit 11 can use the rotation angle signal of the driving roller 3a input from the encoder 31 to measure the distance by which the electrode substrate has been conveyed (the distance traveled by the electrode substrate), and output a conveyed distance measurement result to the obtainment unit 13.

The determining unit 12 determines, based on the time measurement result acquired by the measurement unit 11, whether a predetermined time has elapsed, and outputs a determination result to the obtainment unit 13. Alternatively, the determining unit 12 can determine, based on the conveyed distance measurement result acquired by the measurement unit 11, whether the electrode substrate has been conveyed a predetermined conveyance distance, and output a determination result to the obtainment unit 13. The predetermined time and the predetermined conveyance distance are set in advance in accordance with a size corresponding to the X direction of image data 90 which is stored in the storage unit 16.

By combining the plurality of pieces of detection information input from the detector 4, the obtainment unit 13 obtains a single piece of combined detection information. For example, if it is determined based on the determination result of the determining unit 12 that a predetermined time has elapsed or that the electrode substrate has been conveyed a predetermined conveyance distance, the obtainment unit 13 can combine the plurality of pieces of detection information to obtain a single piece of combined detection information. The obtainment unit 13 outputs the obtained combined detection information to the controller 15. The obtainment unit 13 can also use the rotation angle information about the driving roller 3a, which is detected by the encoder 31 provided in the conveyance mechanism 3, to obtain the combined detection information.

The correction unit 14 corrects, based on the combined detection information obtained by the obtainment unit 13, the image data 90 stored in the storage unit 16 and outputs the corrected image data to the controller 15. The storage unit 16 is an example of a storage unit.

The discharge controller 151 is an example of a controller for controlling the discharge conditions of the liquid discharge head 5. The discharge controller 151 controls, based on the corrected image data input from the correction unit 14, the discharge conditions of the liquid discharge head 5.

The conveyance controller 152 controls the conveyance of the electrode substrate by the conveyance mechanism 3. The irradiation controller 153 controls the light irradiation on each resin precursor layer portion by the light source 6. The heat controller 154 controls the application of heat onto each resin precursor layer portion by the heater 7.

<Arrangement and Detection Information of Detector 4>

Figure 9:
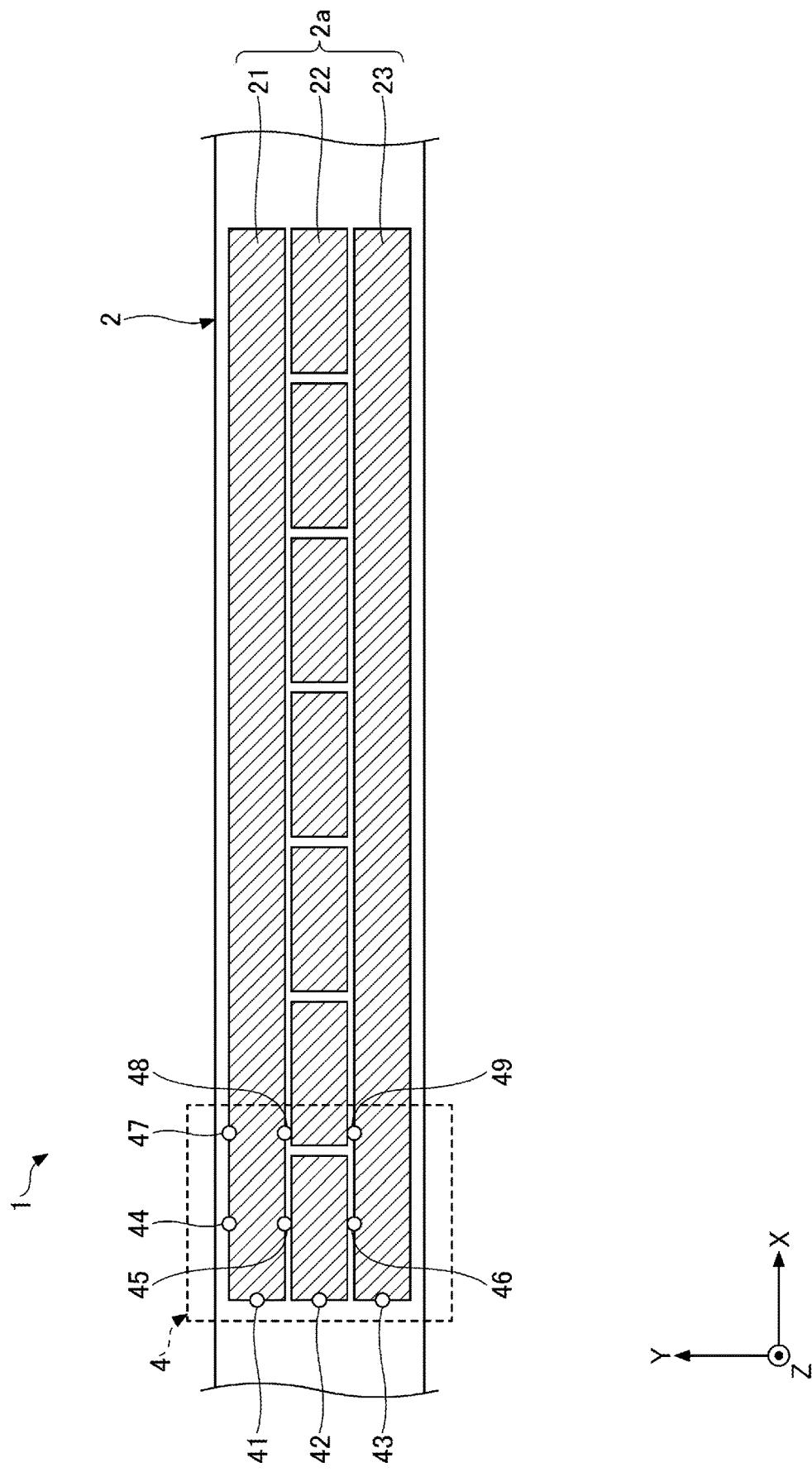
FIG. 9 is a plan view illustrating an example of the arrangement of a detector according to the first embodiment.

The arrangement of the detector 4 will be described with reference to FIGS. 9 and 10. FIG. 9 is a plan view illustrating an example of the arrangement of the detector 4. FIG. 10 is a side view illustrating an example of the arrangement of an optical sensor included in the detector 4.

In FIG. 9, the electrode composition layer portions 2a include three electrode composition layer areas from an electrode composition layer area 21 to an electrode composition layer area 23. The electrode composition layer area 21 and the electrode composition layer area 23 each are an area which has a rectangular shape in the plan view and extends along the X direction. The electrode composition layer areas 22 are seven separate areas, each having a rectangular shape in the plan view, arrayed along the X direction.

The detector 4 includes nine optical sensors 41 to 49. Note that the optical sensors 41 to 49 are arranged at different positions, have different detection areas, or emit light beams of different shapes onto the surfaces of the detection areas. The optical sensors 41 to 49 will be collectively referred to as optical sensors 40 unless otherwise specified hereinafter.

As illustrated in FIG. 10, each optical sensor 40 includes a light emitting element 40a such as a semiconductor laser and a light receiving element 40b such as a photodiode. The wavelength of a light beam from the light emitting element 40a may be wavelength at which the difference between the absorbance in the current collector 2 and the absorbance in the electrode composition layer portion 2a becomes twofold or greater. If the substrate is a current collector containing copper, the wavelength of the light beam emitted from the light emitting element 40a may be in a range from 530 to 630 nm. That is, the light beam emitted from the light emitting element 40a may be near infrared light in the neighborhood of 600 nm.

In a detection area, the shape of an area irradiated (illuminated spot) by the light beam from the light emitting element 40a may be a line shape in which the Y direction is the long direction and the X direction is the short direction. By setting the Y direction to be the long direction, unevenness generated when the electrode composition layer portions are formed by applying a slurry via a die coater can be evened out in the Y direction. This can allow detection to be performed more accurately. Setting the X direction to be the short direction can also reduce errors in timing detection. Note that the shape of the light beam emitted from the light emitting element 40a on the surface of a detection area may be approximately circular.

Each optical sensor 40 causes the light emitting element 40a to illuminate a spot on the electrode substrate such that a point where the properties of the electrode substrate vary is included in the spot, and receives, via a light receiving element, reflected light from the spot on the electrode substrate. The maximum diameter of an illuminated spot may be larger than or equal to the smallest cycle of change in the shape of the electrode composition layer portion 2a at the boundary between the current collector 2 and the electrode composition layer portion 2a.

Each optical sensor 40 may be arranged to have a variable angle of installation. That is, each optical sensor 40 may be arranged so that the angle of incidence of the light emitted from the light emitting element 40a onto the electrode substrate or the angle of incidence of the light reflected from the electrode substrate onto the light receiving element is variable. For example, if the angle of the light emitting element 40a, such as a semiconductor laser, with respect to the electrode substrate is arranged to be approximately the same as the angle of the light receiving element 40b, such as a photodiode, in FIG. 10 when the current collector 2 with high absorbance and one of the electrode composition layer portions 2a with high absorbance are set as detection targets, the light which is the specular reflection of the light emitted from the light emitting element 40a may easily enter the light receiving element 40b. This may reduce the signal-to-noise ratio. By allowing the angle of installation of each optical sensor 40 to be variable, the angle of the light emitting element 40a, such as a semiconductor laser, with respect to the electrode substrate can be arranged to be different from the angle of the light receiving element 40b such as a photodiode in FIG. 10. This can provide an arrangement in which the specularly reflected light (light in which the angle of incidence is equal to the angle of reflectance) from the light emitting element 40a may not easily enter the light receiving element 40, thus leading to an increase in the signal-to-noise ratio. Since a significant drop can be observed at the time of detection as a result, it can improve the accuracy of edge portion detection.

However, if the angle of the light emitting element 40a, such as a semiconductor laser, with respect to the electrode substrate is arranged to be different from the angle of the light receiving element 40b, such as a photodiode, in FIG. 10 when the current collector 2 with low absorbance and one of the electrode composition layer portions 2a with high absorbance are set as detection targets, the light which is the specular reflection of the light emitted from the light emitting element 40a may not easily enter the light receiving element 40b. This may reduce the signal-to-noise ratio. By allowing the angle of installation of each optical sensor 40 to be variable, the angle of the light emitting element 40a, such as a semiconductor laser, with respect to the electrode substrate can be arranged to be approximately the same as the angle of the light receiving element 40b such as a photodiode in FIG. 10. This can provide an arrangement in which the specularly reflected light (light in which the angle of incidence is equal to the angle of reflectance) from the light emitting element 40a may easily enter the light receiving element 40, thus leading to an increase in the signal-to-noise ratio. Since a significant drop can be observed at the time of detection as a result, it can improve the accuracy of edge portion detection.

As described above, a mechanism that allows the angle of installation of each optical sensor 40 to be variable may be provided to accommodate the changes in the properties of the current collector 2 and the electrode composition layer portions 2a.

Each optical sensor 40 outputs, in time series, an electrical signal corresponding to the intensity of reflected light from the electrode substrate. A lens 40c is a lens for focusing the light emitted from the light emitting element 40a.

In FIG. 9, white circles illustrating the nine optical sensors 40 indicate a case where each of the shapes of the spots illuminated by the optical sensors 40 is a circle. In the embodiment, each optical sensor 40 is arranged to be able to detect, as a point where the properties vary, a corresponding boundary between an area where the electrode composition layer portion 2a is formed and an area where the electrode composition layer portion 2a is not formed on the electrode substrate. The electrode composition layer portion 2a has a different reflectance from the current collector 2. Hence, for example, if the reflectance of the current collector 2 is higher than the electrode composition layer portion 2a, the intensity of the reflected light decreases as the ratio of the area where the electrode composition layer portion 2a is formed to the area where the electrode composition layer portion 2a is not formed increases within the illuminated spot in accordance with the conveyance of the electrode substrate in the +X direction.

The detector 4 outputs, as detection information, a time-series electrical signal corresponding to the intensity of the reflected light in accordance with the conveyance of the electrode substrate in the +X direction. Based on the detection information output by the detector 4, the electrode printing apparatus 1 can detect the changes in the positions of boundaries in correspondence with the conveyance of the electrode substrate in the +X direction. Each position where a boundary can be detected can be set by using, as a reference, the position of the liquid discharge head 5, more specifically, the position of each nozzle provided in the liquid discharge head 5 and used for discharging the liquid composition.

As illustrated in FIG. 9, the optical sensor 41 is arranged near the center of the electrode composition layer area 21 in the Y direction and detects a boundary in the X direction of the electrode composition layer area 21. The optical sensor 42 is arranged near the center of the corresponding one of the electrode composition layer areas 22 in the Y direction, and detects a boundary in the X direction of the corresponding one of the electrode composition layer areas 22. The optical sensor 43 is arranged near the center of the electrode composition layer area 23 in the Y direction, and detects a boundary in the X direction of the electrode composition layer area 23. Note that "near the center" refers to a range within 10% from the center of the side in the Y direction of the electrode composition layer area. More specifically, "a range within 10% from the center" is a range extending within 10% from the center along the side length in the Y direction of the electrode composition layer area.

The optical sensor 44 is arranged to be capable of detecting a boundary between the current collector 2 and the +Y side of the electrode composition layer area 21. The optical sensor 45 is arranged to be capable of detecting a boundary between the current collector 2 and the −Y side of the electrode composition layer area 21. The optical sensor 46 is arranged to be capable of detecting a boundary between the current collector 2 and the +Y side of the electrode composition layer area 23.

The optical sensor 47 is arranged, in a position shifted from the optical sensor 44 to the +X side, to be able to detect a boundary between the current collector 2 and the +Y side of the electrode composition layer area 21. The optical sensor 48 is arranged, in a position shifted from the optical sensor 45 to the +X side, to be able to detect a boundary between the current collector 2 and the −Y side of the electrode composition layer area 21. The optical sensor 49 is arranged, in a position shifted from the optical sensor 46 to the +X side, to be able to detect a boundary between the current collector 2 and the +Y side of the electrode composition layer area 23.

The optical sensors 44 to 49 detect changes in the boundary positions in the Y direction in correspondence with the conveyance of the electrode substrate in the +X direction.

Each of the optical sensors 44 to 49 may be arranged so that only a single boundary line, which is extending between the corresponding electrode composition layer area and the current collector in the X direction, is included in the illuminated spot (that is, so that the spot of light straddles the single boundary line). Since only a single boundary line is included instead of a plurality of boundary lines in the illuminated spot, the optical sensor 40 can detect the change in the boundary more accurately. The width of the illuminated spot in the Y direction may be less than or equal to the space between the electrode composition layer portions in the Y direction. In other words, the width of the illuminated spot in the Y direction may be less than or equal to the width of the current collector 2 where the electrode composition layer portion is not formed between the electrode composition layer portions. Hence, only one boundary line extending in the X direction can be included the illuminated spot.

Figure 11:
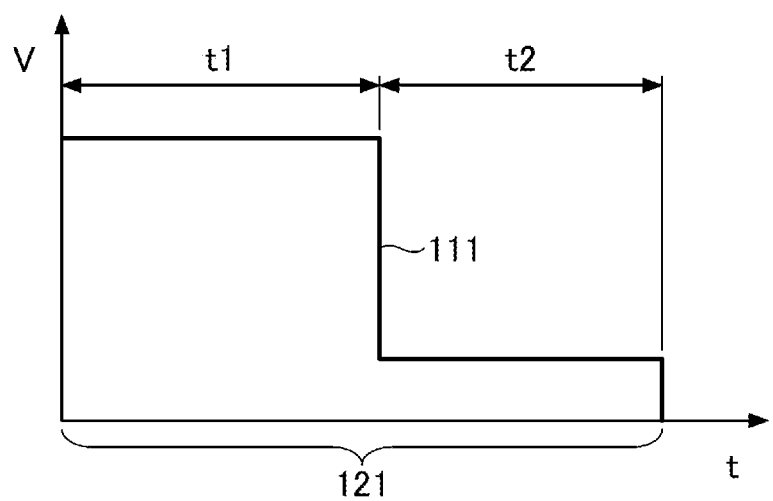
FIG. 11 is a graph illustrating the first example of detection information according to the first embodiment.
Figure 12:
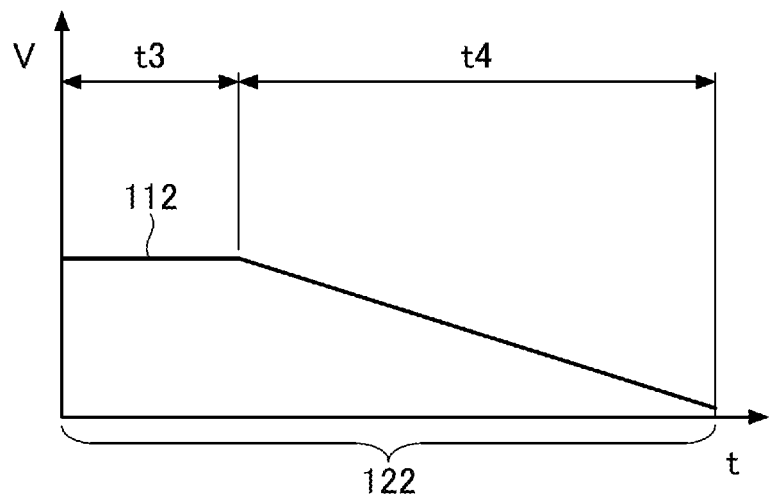
FIG. 12 is a graph illustrating the second example of the detection information according to the first embodiment.

FIGS. 11 and 12 are graphs each illustrating an example of detection information according to the first embodiment. FIG. 11 illustrates detection information 111 output by the optical sensor 41, and FIG. 12 illustrates detection information 112 output by the optical sensor 44. In each of FIGS. 11 and 12, the abscissa indicates time and the ordinate indicates the detection information (a voltage signal in this case) output from the optical sensor 40.

In FIG. 11, at period t1, the electrode composition layer portion 2a is not formed in the position of the spot illuminated by the optical sensor 41, and the value of the detection information 111 has increased (the reflectance is high). At period t2, the electrode composition layer portion 2a is formed in the position of the spot illuminated by the optical sensor 41, and the value of the detection information 111 has decreased (the reflectance is low). In other words, the voltage value of the voltage signal has changed in accordance with the position of the boundary in the X direction.

The detector 4 outputs the pieces of detection information 111 obtained in period t1 and period t2 from the optical sensor 41 to the obtainment unit 13. The time obtained by adding period t1 and period t2 is an example of a predetermined time.

The obtainment unit 13 combines the pieces of detection information 111, which are input in time series, to obtain combined detection information 121. The correction unit 14 uses the combined detection information 121 to detect the boundary position in the X direction of the electrode composition layer area 21. If it is determined that the boundary position has shifted from a desired position, the image data 90 is corrected in accordance with the shift.

In a similar manner, the electrode printing apparatus 1 can also use the pieces of detection information output from the optical sensor 42 to detect the boundary in the X direction of the electrode composition layer area 22 and the pieces of detection information output from the optical sensor 43 to detect the boundary in the X direction of the electrode composition layer area 23. If it is determined that the boundary position has shifted from a desired position, the electrode printing apparatus 1 can cause the electrode printing apparatus 14 to correct the image data. By controlling the discharge conditions of the liquid discharge head 5 based on the corrected image data, the electrode printing apparatus 1 can control each position, in the X direction, where the liquid composition discharged from the liquid discharge head 5 lands on the current collector 2.

In FIG. 12, in period t3, the optical sensor 44 illuminates a spot on the electrode substrate such that a part of the spot is on the electrode composition layer portion 2a and the remaining part of spot is on the current collector 2. Hence, the value of the detection information 112 decreases compared to a case where the spot is only on the current collector 2. At period t4, the boundary on the +Y side of the electrode composition layer portion 2a gradually shifts more toward the +Y side, decreasing the area of the spot on the current collector 2. As a result, the value of the detection information 112 gradually decreases (the reflectance decreases). In other words, the voltage value of the voltage signal decreases in accordance with the position of the boundary in the Y direction.

The detector 4 outputs the pieces of the detection information 112 obtained in period t3 and period t4 to the obtainment unit 13. The obtainment unit 13 combines the pieces of detection information 112, which are input in time series, to obtain the combined detection information 122. The time obtained by adding period t3 and period t4 is an example of a predetermined time.

The correction unit 14 obtains, based on the combined detection information 122, the information about the position of the boundary on the +Y side of the electrode composition layer area 21, and corrects the image data 90 in accordance with the change in the position of the boundary. In a similar manner, if it is determined based on the detection information output from the optical sensor 48 and the optical sensor 49 that the position of the boundary in the Y direction of the corresponding electrode composition layer area 22 and the position of the boundary in the Y direction of the electrode composition layer area 23 have changed, the electrode printing apparatus 1 causes the correction unit 14 to correct the image data. The electrode printing apparatus 1 can use the corrected image data to control the discharge conditions of the liquid discharge head 5, and control the positions where the liquid composition discharged from the liquid discharge head 5 lands on the electrode substrate in the Y direction.

The electrode printing apparatus 1 can not only detect the shift in the position of the electrode composition layer portion 2a in the Y direction, but also detect the change in the width (size) of the electrode composition layer portion 2a in the Y direction. For example, if the boundary position on the +Y side of the electrode composition layer area 21 is gradually shifting more toward the +Y side (that is, the voltage value is gradually decreasing) and the boundary position on the −Y side of the electrode composition layer area 21 is gradually shifting more toward the −Y side (that is, the voltage value is gradually decreasing) in accordance with the conveyance of the electrode substrate in the +X direction, the electrode printing apparatus 1 can detect that the width of the electrode composition layer area 21 in the Y direction is gradually increasing.

The relationship between the shift in the position of a boundary in the Y direction and the change in the voltage value in correspondence with the conveyance of the electrode substrate in the +X direction is associated in advance in accordance with the arrangement position of each optical sensor 40. The storage unit 16 stores the associated information. The electrode printing apparatus 1 refers, based on the change in the voltage value, to the storage unit 16 to detect the direction in which the position of a boundary has shifted in the Y direction, thus detecting the change in the width in the Y direction.

The electrode printing apparatus 1 causes the correction unit 14 to correct the image data in accordance with this change in the width. The electrode printing apparatus 1 controls, based on the corrected image data, the discharge condition of the liquid discharge head 5 to control the position where the liquid composition discharged from the liquid discharge head 5 lands on the electrode substrate.

By causing the detector 4 to detect at least two points, which are along the Y direction, where the properties of the boundary between the current collector 2 and the electrode composition layer portion 2a vary, the electrode printing apparatus 1 can detect the change in the width in the Y direction of one electrode composition layer portion 2a.

<Example of Operation of Electrode Printing Apparatus 1>

Figure 13:
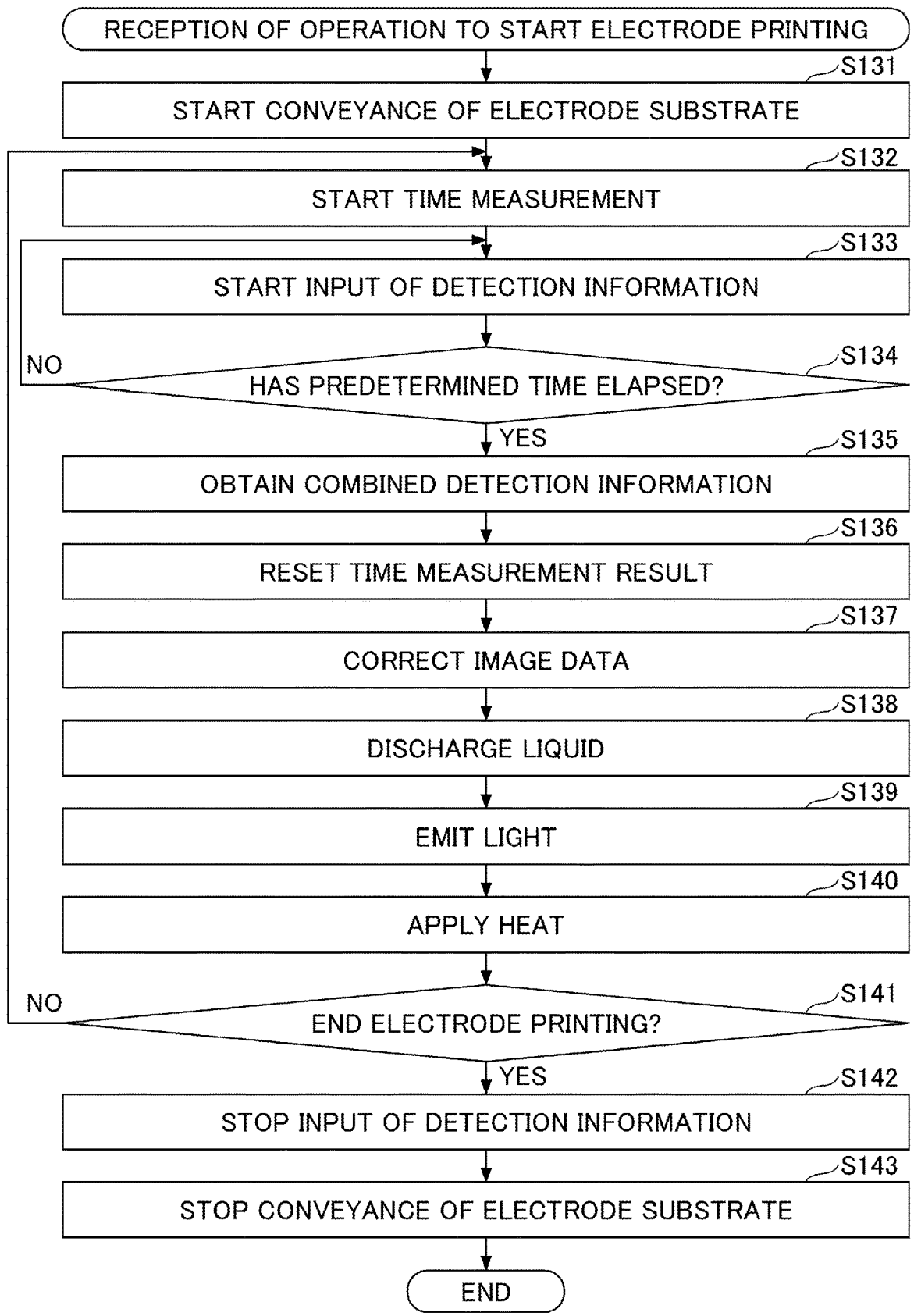
FIG. 13 is a flowchart illustrating an example of the operation of the electrode printing apparatus according to the first embodiment.

FIG. 13 is a flowchart illustrating an example of an operation of the electrode printing apparatus 1. The electrode printing apparatus 1 starts the operation illustrated in FIG. 13 when the operation is triggered by the reception of an operation input that the user has performed on the operation unit 8 to start electrode printing.

First, in step S131, the electrode printing apparatus 1 causes the conveyance controller 152 to drive the conveyance mechanism 3 to start conveying the electrode substrate in the +X direction. The conveyance speed of the electrode substrate here is in, for example, the range from 0.1 m/min to several 100 m/min. The electrode printing apparatus 1 causes the conveyance mechanism 3 to continue conveying the electrode substrate until the electrode substrate is to be stopped.

Next, in step S132, the electrode printing apparatus 1 causes the measurement unit 11 to start counting the clock signal of the CPU 101 to start the measurement of time.

Next, in step S133, the electrode printing apparatus 1 causes the obtainment unit 13 to start receiving the detection information about the respective boundaries between the current collector 2 and the electrode composition layer portions 2a detected by the detector 4, and causes the storage unit 16 to temporarily hold the plurality of pieces of detection information that have been received. The electrode printing apparatus 1 continues to receive the detection information until it stops the input of the detection information by the detector 4.

Next, in step S134, the electrode printing apparatus 1 causes the determining unit 12 to determine, based on the time measurement result obtained by the measurement unit 11, whether the predetermined time has elapsed.

If it is determined in step S134 that the predetermined time has not elapsed (NO in step S134), the electrode printing apparatus 1 executes the operation of step S133 again.

On the other hand, if it is determined in step S134 that the predetermined time has elapsed (YES in step S134), the electrode printing apparatus 1 obtains the combined detection information by causing, in step S135, the obtainment unit 13 to combine the plurality of pieces of detection information temporarily held in the storage unit 16.

Next, in step S136, the electrode printing apparatus 1 resets the time measurement result obtained by the measurement unit 11. Note that the order of the operations of steps S135 and S136 may be switched. The operations of steps S135 and S136 may also be performed in parallel.

Next, in step S137, the electrode printing apparatus 1 causes the correction unit 14 to read the image data 90 stored in the storage unit 16 and to correct the read image data 90 based on the combined detection information obtained by the obtainment unit 13. Subsequently, the correction unit 14 outputs the corrected image data to the controller 15 and deletes the plurality of pieces of detection information temporarily held in the storage unit 16.

Next, in step S138, at the timing when the electrode composition layer portions 2a formed on the current collector 2 of the electrode substrate have reached a position facing the liquid discharge head 5, the electrode printing apparatus 1 causes the discharge controller 151 to drive the liquid discharge head 5 to discharge the liquid composition based on the corrected image data. As a result, liquid composition layer portions are formed by the application of the liquid composition on the electrode composition layer portions 2a.

Next, in step S139, at the timing when the electrode composition layer portions 2a which has the liquid composition layer portions formed thereon have reached a position facing the light source 6, the electrode printing apparatus 1 causes the irradiation controller 153 to drive the light source 6 to irradiate each liquid composition layer portion with light to cure the resin precursor layer portion. Note that the irradiation intensity at the position of the surface of each liquid composition layer portion varies in accordance with the wavelength of the light source to be used. That said, the irradiation intensity can fall within a range from a few mW/cm$^2$ to 1 kW/cm$^2$. The irradiation time of each liquid composition layer portion can be set appropriately in accordance with the sensitivity of the liquid composition, the conveyance speed of the electrode substrate, and the like.

Next, in step S140, at the timing when the electrode composition layer portions 2a each carrying the cured resin precursor layer portion have reached a position facing or near the heater 7, the electrode printing apparatus 1 causes the heat controller 154 to drive the heater 7. The electrode printing apparatus 1 heats the resin precursor layer portion formed on the electrode composition layer portions 2a to promote a cross-linking reaction in the resin precursor layer portions. Note that in the electrode printing apparatus 1, the heating time by the heater 7 is relatively short and is approximately a few seconds to a few tens of seconds. Hence, if the curing of the resin precursor layer portions is to be completed by the heater 7, the electrode printing apparatus 1 may perform heating at a maximum temperature of approximately, for example, 200 C.° or less or at a relatively high temperature ranging from approximately 80 C.° to 200 C.° or 60 C.° to 180 C°.

Next, in step S141, the electrode printing apparatus 1 causes the processor 100 to determine whether to end the electrode printing. For example, if the user has used the operation unit 8 to perform an operation input to end the electrode printing, the electrode printing apparatus 1 can determine to end the electrode printing.

In step S141, if it is determined that the electrode printing is not to be ended (NO in step S141), the electrode printing apparatus 1 performs the operations of step S132 and its subsequent steps again.

On the other hand, in step S141, if it is determined that the electrode printing is to be ended (YES in step S141), the electrode printing apparatus 1 causes, in step S142, the obtainment unit 13 to stop receiving the detection information from the detector 4.

Next, in step S143, the electrode printing apparatus 1 stops the conveyance of the electrode substrate by causing the conveyance controller 152 to stop the conveyance mechanism 3.

In this manner, the electrode printing apparatus 1 can form the resin layer portion 2b on each electrode composition layer portion 2a on the current collector 2.

Subsequently, the electrode substrate is wound into a roll or conveyed to a stocker (a container for storing thin-film electrodes). Note that the electrode printing apparatus may also include a press roller as a device for pressing the fabricated thin-film electrodes and a cutting mechanism such as a slit blade or a laser for dividing the thin-film electrodes.

The electrode printing apparatus 1 according to the embodiment may include two or more liquid discharge heads that discharge different liquid compositions (for example, a liquid composition for the resin layer portions and a liquid composition for the inorganic layer portions) to implement simultaneous multilayer printing or to mix liquid compositions at the landing point.

To allow the electrode substrate to move relative to the liquid discharge head 5, the conveyance mechanism 3, which conveys the electrode substrate to form resin layer portions or inorganic layer portions that have a desired thickness, is provided in the electrode printing apparatus 1 to move the electrode substrate. However, the liquid discharge head 5 may be arranged to move in the −X direction. Alternatively, both the electrode substrate and the liquid discharge head 5 may be arranged to move.

Figure 14:
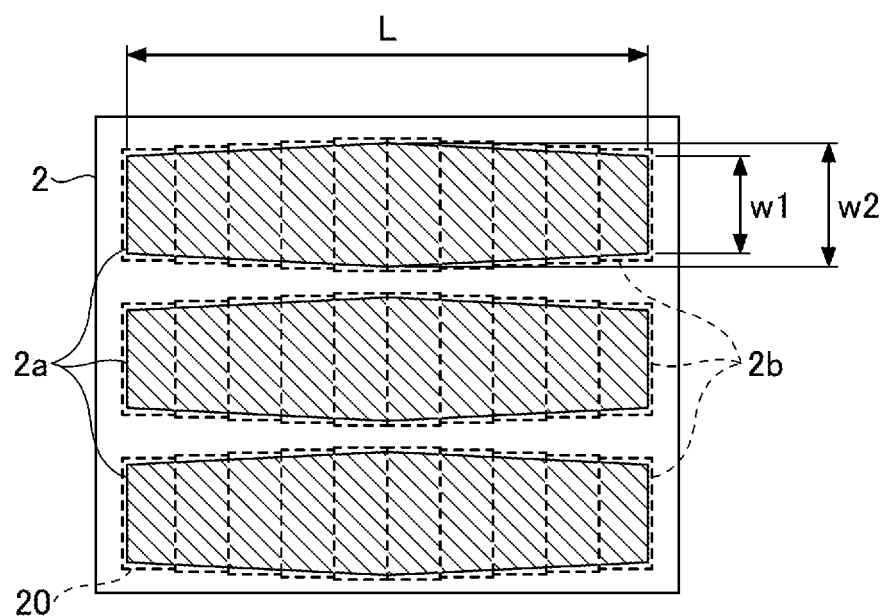
FIG. 14 is a view illustrating an example of the formation of resin layer portions by the electrode printing apparatus according to the first embodiment.

FIG. 14 is a view illustrating an example of a result of the formation of the resin layer portions 2*b* by the electrode printing apparatus 1. FIG. 14 can be viewed in a similar manner to FIG. 4. In FIG. 14, a plurality of rectangular areas 20 that are indicated by broken lines and form each resin layer portion 2*b* represent the areas of the resin layer portion 2*b* formed based on one image data. The respective widths of rectangular areas 20 in the Y direction are corrected in accordance with the change in the respective widths of the corresponding electrode composition layer portion 2*a* in the Y direction. Thus, uncovered areas can be eliminated, and the electrode composition layer portions 2*a* can be entirely covered with the resin layer portion 2*b*.

<Effect of Electrode Printing Apparatus 1>

As described above, the electrode printing apparatus 1 (electrode manufacturing apparatus, liquid discharge apparatus) is an apparatus that discharges a liquid composition (liquid) onto the electrode substrate (liquid discharge target) which is being conveyed in the X direction (predetermined direction). The electrode printing apparatus 1 includes the detector 4 (detector), the liquid discharge head (liquid discharger) provided on the downstream side of the detector 4 in the X direction, and the controller 15 (controller) which controls the discharge conditions of the liquid discharge head 5. A plurality of boundaries (points where a property varies) of the current collector 2 and the electrode composition layer portions 2*a* are present along the Y direction (direction intersecting the predetermined direction) on the current collector 2 of the electrode substrate. The detector 4 detects, at least, the boundaries in time series and outputs the plurality of pieces of detection information 112 which are based on the boundaries detected in time series. The controller 15 controls the liquid discharge head 5 based on the combined detection information 122 obtained by combining the plurality of pieces of detection information 112.

When the respective widths of the electrode composition layer portions 2*a* on the current collector 2 in the Y direction change in accordance with the conveyance of the electrode substrate in the +X direction, the pieces of detection information 112, which are obtained by causing the detector 4 to detect the plurality of the boundaries between the electrode composition layer portions 2*a* in the Y direction, change in accordance with the change in the respective widths. The electrode printing apparatus 1 can correct the image data in accordance with the combined detection information 122, which includes such time-series information about the change in the respective widths, to control the discharge conditions of the liquid discharge head 5. As a result, the liquid discharge operation by the liquid discharge head 5 can be controlled in accordance with changes in the electrode substrate.

Also, in the embodiment, the detector 4 outputs, during the predetermined time or while the electrode substrate is being conveyed a predetermined conveyance distance, the plurality of pieces of detection information 112 which are detected in time series. This allows predetermined time-series detection information to be obtained in accordance with a desired obtainment condition based on the size or the like of the image data corresponding to the X direction, thus allowing the discharge conditions of the liquid discharge head 5 to be controlled.

Also, in the embodiment, the properties of the electrode substrate include at least one of the thickness, the color, or the reflectance of the electrode substrate or the thickness, the color, or the reflectance of the current collector 2 formed on the electrode substrate. Hence, the changes in the respective widths of the electrode composition layer portions 2*a* in the Y direction can be detected in correspondence with the conveyance of the electrode substrate in the +X direction.

Also, in the embodiment, each optical sensor 40 of the detector 4 includes the light emitting element 40*a*, which illuminates a spot on the electrode substrate, and the light receiving element 40*b*, which receives the reflected light from the spot on the electrode substrate and outputs an electrical signal corresponding to the intensity of the reflected light.

Each light emitting element 40*a* illuminates a spot on the electrode substrate such that the boundary between the corresponding electrode composition layer portion 2*a* and the current collector 2 is included in the illuminated spot. The plurality of pieces of detection information include a voltage signal (electrical signal) output in time series by each light receiving element 40*b*. The controller 15 controls the discharge conditions of the liquid discharge head 5 in accordance with the fluctuation in the voltage value of each voltage signal. In this embodiment, such a simple arrangement may be used to detect the changes in the positions of the boundaries between the current collector 2 and the electrode composition layer portions 2*a*, and to control the discharge condition of the liquid discharge head 5. Note that the electrical signal may be a current signal instead of a voltage signal. That is, the controller 15 can control the discharge conditions of the liquid discharge head 5 in accordance with the fluctuation in the current value of the current signal output in time series from each light-receiving element.

Also, in the embodiment, the combined detection information includes information about the position of the boundary between each electrode composition layer portion 2*a* and the current collector 2 in the Y direction and information about the position of the boundary between each electrode composition layer portion 2*a* and the current collector 2 in the X direction. Hence, it is possible to detect the respective changes in the X direction and the Y direction of each electrode composition layer portion 2*a* formed on the current collector 2.

Also, in the embodiment, the electrode substrate includes the electrode composition layer portions 2*a* (first film areas) which are already formed in a predetermined pattern on the current collector 2. The controller 15 controls, based on the combined detection information 122, the discharge conditions of the liquid discharge head 5 so that the liquid composition discharged by the liquid discharge head 5 form the resin layer portions 2*b* (second film areas) for covering the electrode composition layer portions 2*a*. Since it is possible to cover each electrode composition layer portion 2*a* with the resin layer portion 2*b* in accordance with the pattern of the electrode composition layer portions 2*a* formed on the current collector 2, the insulating function and the like of the resin layer portions 2*b* formed by the liquid composition can be implemented effectively. Furthermore, the area of the electrode substrate can be used effectively, even when conductive areas are to be cut out and used from the electrode substrate, while preventing failures such as short-circuiting of the electrode substrate.

In addition, the controller 15 controls the discharge conditions of the liquid discharge head 5 so that the resin layer portion 2b for covering each electrode composition layer portion 2a is formed along the X direction and the Y direction while protruding from the electrode composition layer portion 2a by a predetermined length on the electrode substrate. The predetermined length may be 1.0 mm or less. More specifically, the width P of protrusion of FIG. 3 corresponds to the predetermined length, and the width P of protrusion may be 1.0 mm or less.

By setting the width P of protrusion to be 1.0 mm or less, the electrode printing apparatus 1 can more reliably cover each electrode composition layer portion 2a with the resin layer portion 2b. As a result, functions such as the insulating function of the resin layer portions 2b formed by the liquid composition can be implemented more effectively.

Second Embodiment

An electrode printing apparatus 1a according to the second embodiment will be described. Note that the same reference numerals are used to denote the same components as those in the first embodiment, and a repetitive description thereof will be omitted. This will similarly apply to other embodiments to be described hereinafter.

Figure 15:
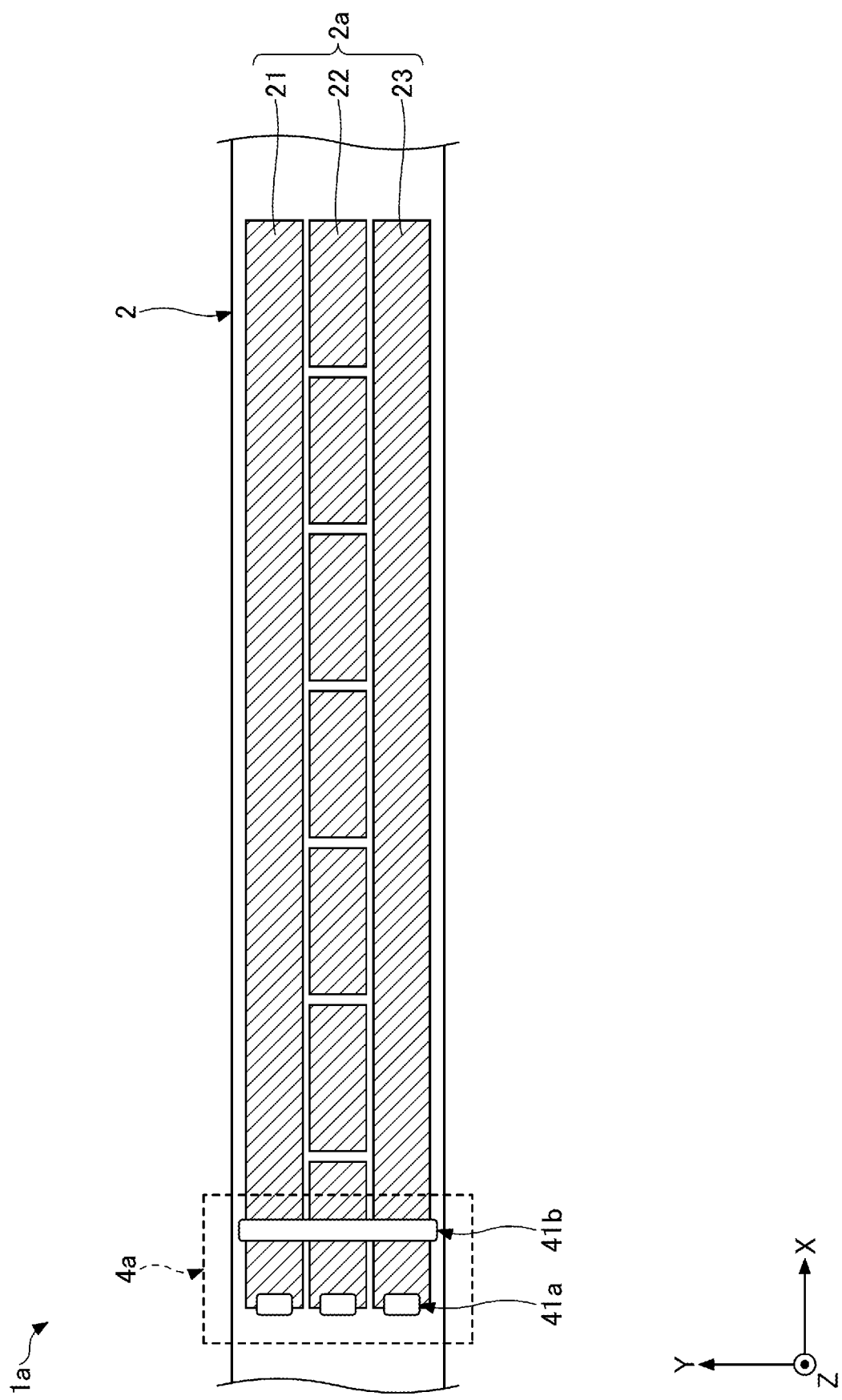
FIG. 15 is a plan view illustrating an example of the arrangement of a detector according to the second embodiment.

FIG. 15 is a plan view illustrating an example of the arrangement of the electrode printing apparatus 1a. The electrode printing apparatus 1a includes a detector 4a. The detector 4a also includes optical sensors 41a and an inline sensor 41b. The term "optical sensors 41a" generally refers to three optical sensors.

The arrangement of each optical sensor 41a is similar to the arrangement of each optical sensor 40 according to the first embodiment. Each of the three optical sensors 41a is arranged near the center in the Y direction of a corresponding one of three electrode composition layer areas, which are constituted by the electrode composition layer areas 21 to 23, so as to be paired with the corresponding one of the three electrode composition layer areas. Each optical sensor 41a detects the position in the X direction of the corresponding electrode composition layer area. Note that "near the center" refers to a range within 10% from the center of the side in the Y direction of the electrode composition layer area. More specifically, "a range within 10% from the center" is a range extending within 10% from the center along the side length in the Y direction of the electrode composition layer area.

The inline sensor 41b includes a line sensor which is constituted by a plurality of pixels arrayed along the Y direction. Each pixel in the line sensor outputs a voltage signal corresponding to the intensity of received light. The inline sensor 41b may also include, as needed, a light source to irradiate the electrode substrate with light for image capturing.

Figure 16:
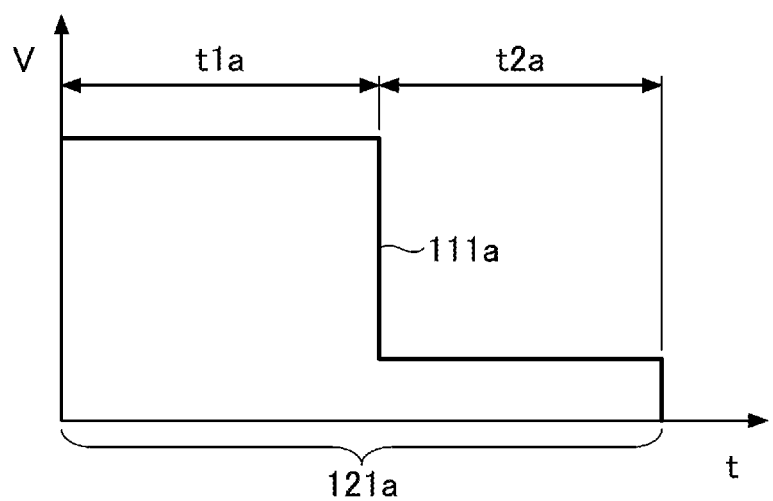
FIG. 16 is a graph illustrating the first example of combined detection information according to the second embodiment.
Figure 17:
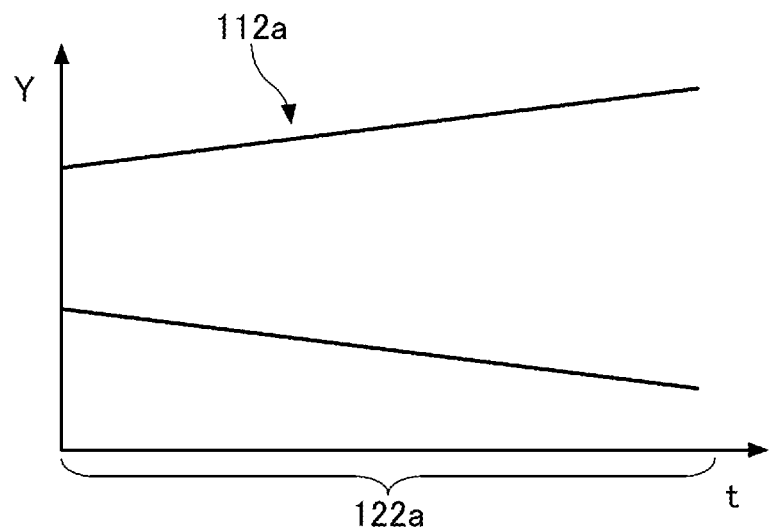
FIG. 17 is a graph illustrating the second example of the combined detection information according to the second embodiment.

FIGS. 16 and 17 are graphs each illustrating an example of detection information according to the second embodiment. FIG. 16 illustrates detection information 111a output from each optical sensor 41a. In FIG. 16, the abscissa indicates time, and the ordinate indicates the detection information (a voltage in this case) output by the optical sensor 41a.

The detector 4a outputs the pieces of detection information 111a, which were obtained by each optical sensor 41a at time t1a and time t2a, to the obtainment unit 13. The obtainment unit 13 combines the pieces of detection information 111a, which are input in time series, to obtain combined detection information 121a. The correction unit 14 detects, based on the combined detection information 121a, a position of the electrode composition layer area 21 in the X direction. If the position has shifted from a desired position, the correction unit 14 corrects the shift in accordance with the image data 90. By using the corrected image data to control the discharge condition of the liquid discharge head 5, the electrode printing apparatus 1a can control each position where the liquid composition discharged from the liquid discharge head 5 lands on the electrode substrate in the X direction.

FIG. 17 illustrates detection information 112a output from the inline sensor 41b. In FIG. 17, the abscissa indicates time, and the ordinate indicates a position (pixel position) in the Y direction. The detection information 112a is a line image captured by the inline sensor 41b.

Since the relative positions of the inline sensor 41b and the electrode substrate in the X direction change in accordance with time, the abscissa corresponds to a position in the X direction. Hence, combined detection information 122a, which is obtained by causing the obtainment unit 13 to combine the pieces of detection information 112a output in time series from the detector 4a, corresponds to a two-dimensional image obtained by capturing the electrode substrate from the +Z direction.

As the position or the size of each electrode composition layer portion 2a formed on the current collector 2 changes in accordance with the conveyance of the electrode substrate in the +X direction, an image of the electrode composition layer portion 2a corresponding to this change is obtained from the combined detection information 122a. The correction unit 14 uses the combined detection information 122a to detect the position or the size of the electrode composition layer portion 2a in the Y direction. If the position has shifted from the desired position, the correction unit 14 corrects the image data 90 in accordance with the shift. By controlling the discharge conditions of the liquid discharge head 5 based on the corrected image data, the electrode printing apparatus 1a can control each position where the liquid composition discharged from the liquid discharge head 5 lands on the electrode substrate in the Y direction.

Including the inline sensor 41b in the detector 4a in this manner allows the electrode printing apparatus 1a to detect the position or the size of the electrode composition layer portion 2a in the Y direction more accurately. Accordingly, each position where the liquid composition discharged from the liquid discharge head 5 lands on the electrode substrate in the Y direction can be controlled more accurately. Note that other effects are similar to those of the first embodiment.

Third Embodiment

An electrode printing apparatus 1b according to the third embodiment will be described.

Figure 18:
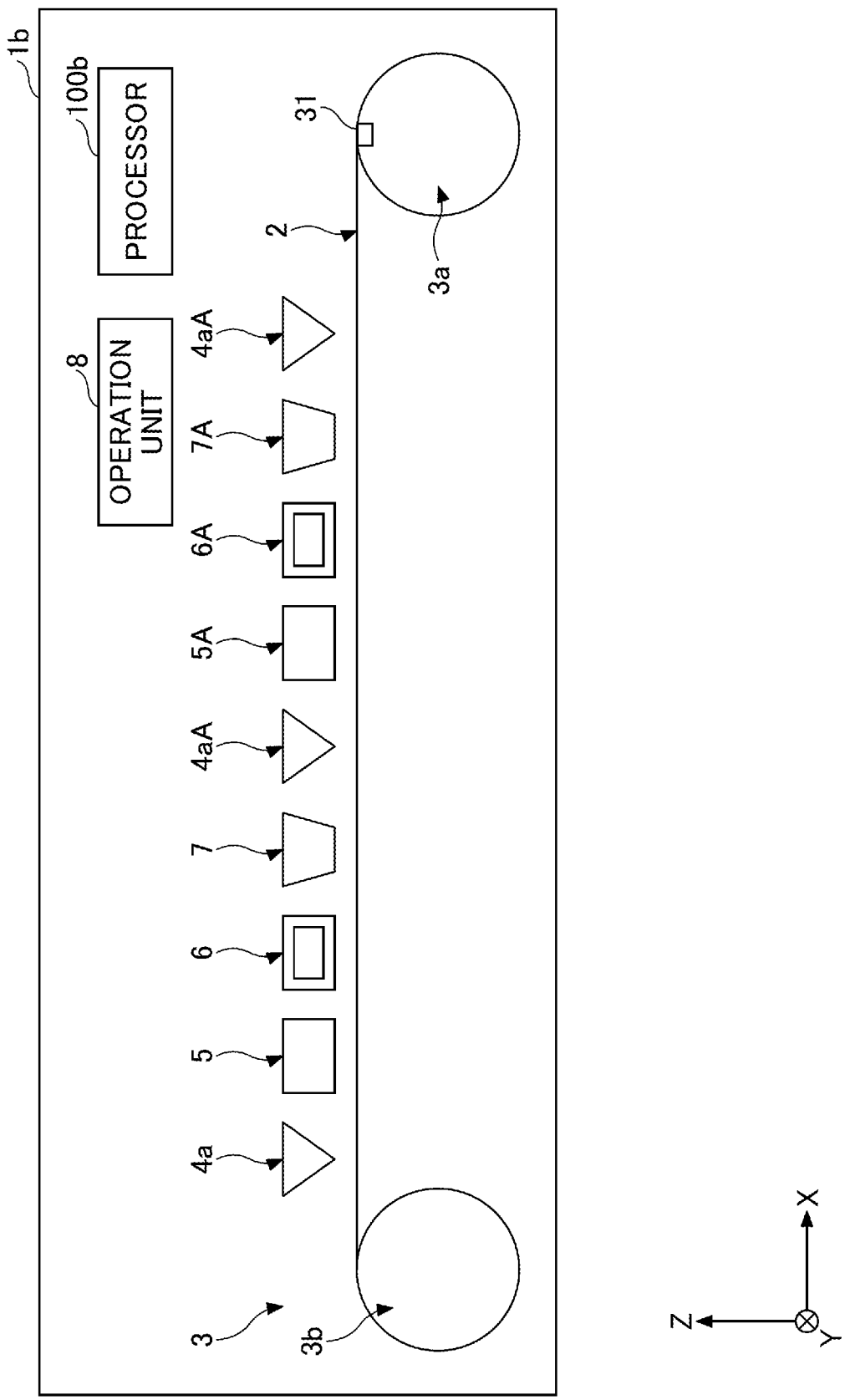
FIG. 18 is a side view illustrating an example of the arrangement of an electrode printing apparatus according to the third embodiment.

The arrangement of the electrode printing apparatus 1b will be described with reference to FIGS. 18 and 19. FIGS. 18 and 19 are views each illustrating an example of the arrangement of the electrode printing apparatus 1b. FIG. 18 is a side view of the electrode printing apparatus 1b, and FIG. 19 is a plan view of the electrode printing apparatus 1b.

As illustrated in FIGS. 18 and 19, the electrode printing apparatus 1b includes, from an upstream side in the +X direction to a downstream side, the detector 4a, the liquid discharge head 5, the light source 6, the heater 7, a detector 4aA, a liquid discharge head 5A, a light source 6A, a heater 7A, and the detector 4aA in this order. The electrode printing apparatus 1b also includes a processor 100b.

Each detector 4aA is an example of a downstream detection unit arranged on the downstream side of the liquid discharge head 5 in the +X direction. Each detector 4aA outputs a plurality of pieces of downstream detection information obtained by detecting, in time series, each point where the properties vary on the electrode substrate.

At a position where the electrode substrate faces each detector 4aA, the resin layer portions 2b are formed on the electrode composition layer portions 2a on the current collector 2. Each detector 4aA is arranged to be capable of detecting, in a plan view, the points where properties vary. The points where properties vary are the respective positions of boundaries between the resin layer portions 2b and the current collector 2.

The pieces of downstream detection information obtained by the detectors 4aA are used to detect the respective positions or sizes of the resin layer portions 2b, an area with a defect such as an area where the resin layer portion 2b is not partially formed, and the like on the electrode substrate. Note that in the specification and the appended claims, an area with a defect denotes an area where the difference between a film thickness in the Z direction and an area around the area with the defect becomes 1.0% or more. The electrode printing apparatus 1b can control, in accordance with the detection result, the discharge conditions of the liquid discharge head 5, which is arranged on the upstream side of the detectors 4aA in the +X direction, and the discharge conditions of the liquid discharge head 5A which is arranged on the downstream side of the detector 4aA in the +X direction.

The liquid discharge head 5A discharges, onto the electrode substrate on which the resin layer portions 2b have been formed on the upstream side of the liquid discharge head 5A in the +X direction, the liquid composition to continuously form the electrode composition layer portions or the resin layer portions.

A die head having an intermittent setting function, a high-speed dispenser, a jet nozzle, a spray nozzle, a liquid discharge head similar to that described above, or the like may be used instead of the liquid discharge head 5A to apply the liquid composition.

Based on defect area information which is obtained based on the downstream detection information from the detector 4aA, the liquid discharge head 5A forms the electrode composition layer portion or the resin layer portion on an area with a defect on the electrode substrate.

The light source 6A irradiates, with light, the additional liquid composition, which was applied from the liquid discharge head 5A onto the electrode substrate, to cure the additional liquid composition. The heater 7A heats and dries the additional liquid composition.

<Example of Functional Arrangement of Processor 100b>

Figure 20:
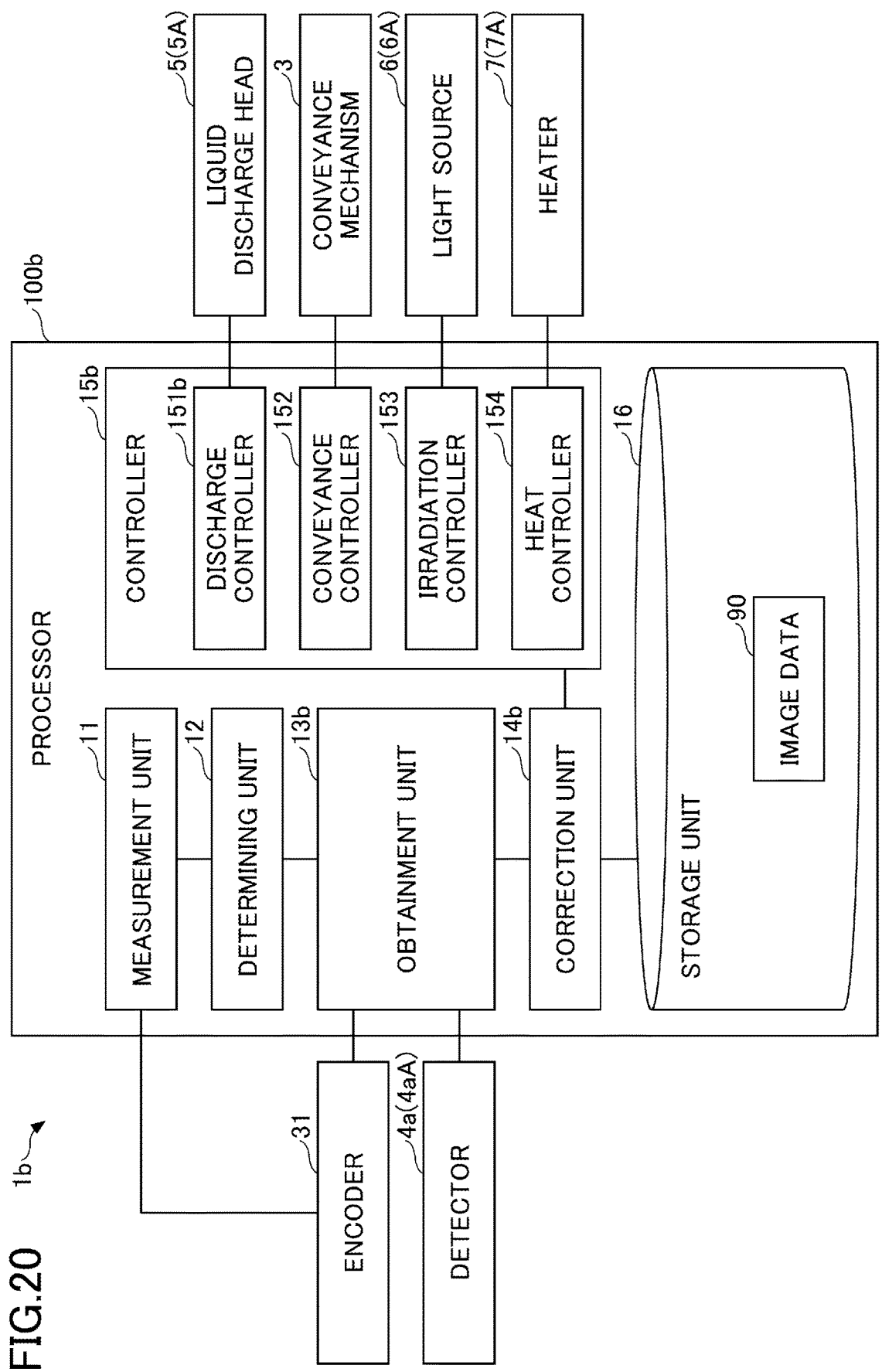
FIG. 20 is a block diagram illustrating an example of the functional arrangement of a processor according to the third embodiment.

FIG. 20 is a block diagram illustrating an example of the functional arrangement of the processor 100b. The processor 100b includes an obtainment unit 13b, a correction unit 14b, and a controller 15b. The controller 15b also includes a discharge controller 151b.

In addition to obtaining one piece of combined detection information by combining the plurality of pieces of detection information output from each detector 4a, the obtainment unit 13b obtains one piece of combined downstream detection information by combining a plurality of pieces of downstream detection information output from each detector 4aA.

Based on the combined detection information and the combined downstream detection information obtained by the obtainment unit 13b, the correction unit 14b corrects the image data which is used to form the resin layer portions 2b by the liquid discharge head 5 and the image data which is used to form the resin layer portions or the electrode composition layer portions by the liquid discharge head 5A.

The discharge controller 151b can control the discharge conditions of the liquid discharge head 5 based on the combined detection information, and control the respective discharge conditions of the liquid discharge head 5 and the liquid discharge head 5A based on the combined downstream detection information.

As described above, the electrode printing apparatus 1b further includes the detectors 4aA (downstream detection unit) on the downstream side of the liquid discharge head 5 in the +X direction. The detectors 4aA output a plurality of pieces of downstream detection information which are obtained by detecting, in time series, points where properties vary on the electrode substrate.

The controller 15b uses one piece of combined downstream detection information, which is obtained by combining the plurality of pieces of downstream detection information, to control the discharge conditions of the liquid discharge head 5 and the discharge conditions of the liquid discharge head 5A. As a result, if the respective positions or sizes of the resin layer portions 2b formed on the electrode substrate have shifted from the desired positions or sizes, the formation of subsequent resin layer portions 2b can be corrected by feeding back the information about the shift to the controller 15b. Also, if areas with a defect are included in the resin layer portions 2b formed on the upstream side in the +X direction, the liquid discharge head 5A can discharge and apply an additional liquid composition on the downstream side to reduce or eliminate the areas with the defect.

Fourth Embodiment

An electrode printing apparatus 1c according to the fourth embodiment will be described.

Figure 21:
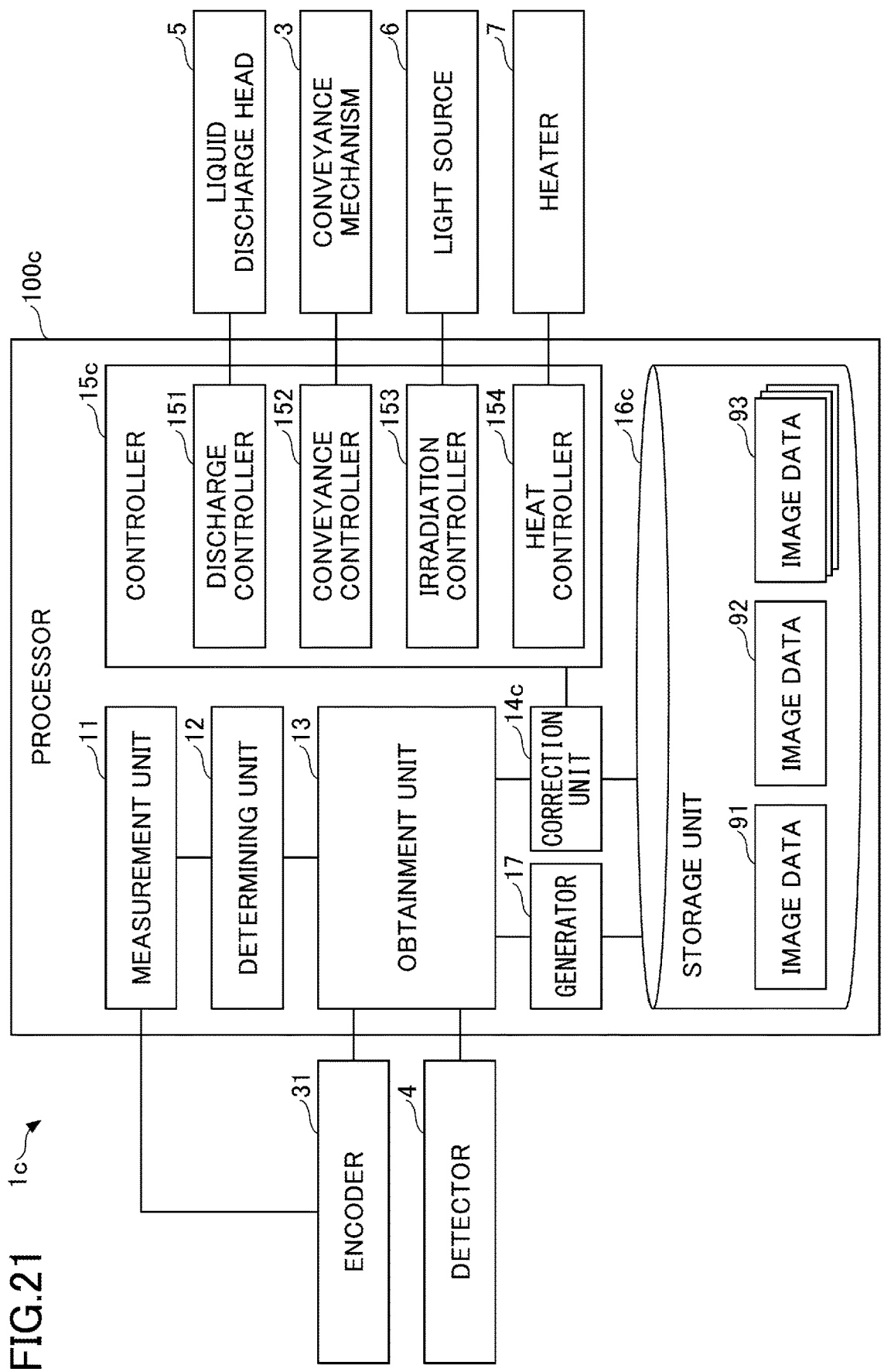
FIG. 21 is a block diagram illustrating an example of the functional arrangement of a processor according to the fourth embodiment.

FIG. 21 is a block diagram illustrating an example of the functional arrangement of a processor 100c included in the electrode printing apparatus 1c. The processor 100c includes a generator 17, a storage unit 16c, and a correction unit 14c.

The generator 17 is an example of a generator that uses a single piece of combined detection information, which is obtained by combining a plurality of pieces of detection information output from the detector 4, to generate a plurality of image data that have different widths in the Y direction before the electrode printing apparatus 1c performs a liquid composition discharge operation on the electrode substrate which is being conveyed in the +X direction.

The storage unit 16c stores image data 91, image data 92, and image data 93, which are the plurality of image data generated by the generator 17, in association with the combined detection information used during the generation of the plurality of image data by the generator 17.

Based on the combined detection information obtained by the obtainment unit 13, the correction unit 14c refers to the storage unit 16c to obtain image data associated with the combined detection information. The obtained image data is output to a controller 15c.

The controller 15c controls the discharge conditions of the liquid discharge head 5 in accordance with the image data input from the correction unit 14c.

FIG. 22 is a view illustrating an example of the image data 91, the image data 92, and the image data 93 as the plurality of image data. A width L1 is the width of the image data 91 in the Y direction, a width L2 is the width of the image data 92 in the Y direction, and a width L3 is the width of the image data 93 in the Y direction. As illustrated in FIG. 22, the width L1, the width L2, and the width L3 are different from each other.

In the above-described embodiments, the correction unit 14 and the correction unit 14b each perform, based on the combined detection information obtained by the obtainment unit 13, processing to correct the image data, which has been set as a reference, to correct the widths in the Y direction to appropriate widths. In contrast, the correction unit 14c selects, based on the combined detection information obtained by the obtainment unit 13, one image data among the image data 91, the image data 92, and the image data 93 already stored in the storage unit 16c to correct the widths in the Y direction of the image data. As a result, the electrode printing apparatus 1c can simplify and speed up the processing for correcting the widths in the Y direction of the image data.

The image data 91, the image data 92, and the image data 93 are generated by the generator 17 and stored in the storage unit 16c before the electrode printing apparatus 1c performs the operation to form the resin layer portions 2b on the electrode substrate.

Figure 23:
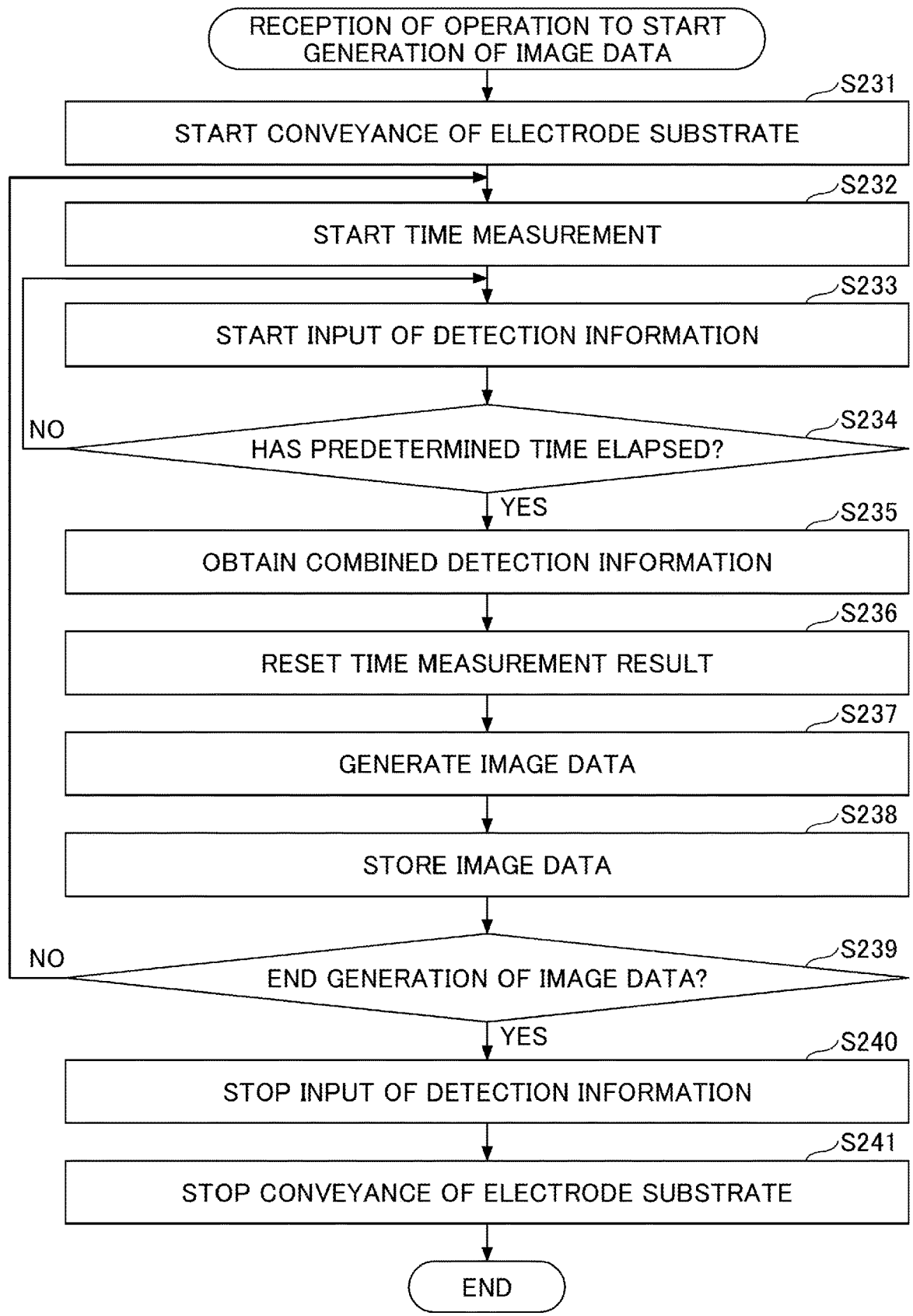
FIG. 23 is a flowchart illustrating an example of an operation to generate a plurality of image data by an electrode printing apparatus according to the fourth embodiment.

FIG. 23 is a flowchart illustrating an example of an operation performed by the electrode printing apparatus 1c to generate a plurality of image data. The electrode printing apparatus 1c starts the operation illustrated in FIG. 23 when the operation is triggered by the reception of an operation input that the user has performed on the operation unit 8.

As long as it is during a time before the electrode printing apparatus 1c is to form the resin layer portions 2b on the electrode substrate, the electrode printing apparatus 1c can generate a plurality of image data at arbitrary times without any particular limitations. However, to allow the generated image data to function appropriately, the electrode printing apparatus 1c may generate a plurality of image data at a time near a time at which the electrode printing apparatus 1c is to form the resin layer portions 2b on the electrode substrate. Alternatively, the electrode printing apparatus 1c may generate a plurality of image data after the environment in which the electrode printing apparatus 1c operates has changed due to a change in the installation location of the electrode printing apparatus 1c. The electrode printing apparatus 1c may also generate a plurality of image data at regular schedules such as every morning or the like.

First, in step S231, the electrode printing apparatus 1c causes the conveyance controller 152 to drive the conveyance mechanism 3 to start conveying the electrode substrate in the +X direction. The conveyance speed of the electrode substrate at this time may be the same as the conveyance speed set when electrode printing is performed by the electrode printing apparatus 1c. The electrode printing apparatus 1c causes the conveyance mechanism 3 to continue to convey the electrode substrate until the electrode substrate is to be stopped.

Next, in step S232, the electrode printing apparatus 1c causes the measurement unit 11 to start counting the clock signal of the CPU 101 to start the measurement of time.

Next, in step S233, the electrode printing apparatus 1c causes the obtainment unit 13 to start receiving the pieces of detection information detected by the detector 4 at the respective boundaries between the electrode composition layer portions 2a and the current collector 2, and causes the storage unit 16c to temporarily hold the plurality of pieces of detection information which have been received. The electrode printing apparatus 1c causes the obtainment unit 13 to continue receiving the detection information until the input of the detection information by the detector 4 is stopped.

Next, in step S234, the electrode printing apparatus 1c causes the determining unit 12 to determine, based on the time measurement result obtained by the measurement unit 11, whether a predetermined time has elapsed.

If it is determined in step S234 that the predetermined time has not elapsed (NO in step S234), the electrode printing apparatus 1c starts the operation of step S233 again.

On the other hand, if it is determined in step S234 that the predetermined time has elapsed (YES in step S234), the electrode printing apparatus 1c causes, in step S235, the obtainment unit 13 to obtain a single piece of combined detection information by combining the plurality of pieces of detection information which are temporarily held in the storage unit 16c.

Next, in step S236, the electrode printing apparatus 1c resets the result of time measurement by the measurement unit 11. Note that the order of the operations of steps S235 and S236 may be switched or the operations of steps S235 and S236 may be performed in parallel.

Next, in step S237, the electrode printing apparatus 1c causes the correction unit 14c to generate, based on the combined detection information obtained by the obtainment unit 13, the image data in which the widths in the Y direction have been corrected. Subsequently, the correction unit 14c outputs the generated image data and the combined detection information to the storage unit 16c, and deletes the plurality of pieces of detection information temporarily held in the storage unit 16c.

Note that the correction unit 14c may read image data which is to serve as reference and is already stored in the storage unit 16c, and correct, based on the combined detection information obtained by the obtainment unit 13, the width in the Y direction of the image data which is to serve as a reference to generate the image data in which the widths in the Y direction have been adjusted appropriately.

Next, in step S238, the electrode printing apparatus 1c causes the storage unit 16c to store the image data, which was generated by the generator 17, in association with the combined detection information.

Next, in step S239, the electrode printing apparatus 1c causes the processor 100c to determine whether to end the electrode printing operation. For example, the electrode printing apparatus 1c may determine to end the electrode printing operation when the user has made an operation input on the operation unit 8 to end the electrode printing operation.

If it is determined in step S239 that the electrode printing operation is not to be ended (NO in step S239), the electrode printing apparatus 1c performs the operations of step S232 and its subsequent steps again.

On the other hand, if it is determined in step S239 that the electrode printing operation is to be ended (YES in step S239), the electrode printing apparatus 1c causes, in step S240, the obtainment unit 13 to stop receiving the detection information input from the detector 4.

Next, in step S241, the electrode printing apparatus 1c causes the conveyance controller 152 to stop the conveyance mechanism 3 to stop the conveyance of the electrode substrate.

In this manner, the electrode printing apparatus 1c can cause the generator 17 to generate image data and cause the storage unit 16c to store the generated image data.

As described above, the electrode printing apparatus 1c includes the storage unit 16c that stores a plurality of image data, which have different widths in the Y direction, in association with combined detection information. The controller 15 refers to the storage unit 16c based on the combined detection information which is obtained by combining the plurality of pieces of detection information output from the detector 4, and controls the discharge conditions of the liquid discharge head 5 in accordance with the image data obtained from the storage unit 16c.

The electrode printing apparatus 1c includes the generator 17 that generates a plurality of image data based on a single piece of combined detection information obtained by combining a plurality of pieces of detection information detected by the detector 4. The generator 17 generates the plurality of image data before the electrode printing apparatus 1c performs the operation for discharging the liquid composition on the electrode substrate which is being conveyed in the +X direction. The storage unit 16c (storage device) stores the plurality of image data generated by the generator 17.

Since this arrangement allows the processing for correcting the widths in the Y direction of the image data to be omitted during the electrode printing operation, the electrode printing apparatus 1c can simplify and speed up the processing.

Decreasing the installation distance M (see FIG. 5) between the detector 4 and the liquid discharge head 5 in the X direction allows the size of the electrode printing apparatus 1c to be reduced. To decrease the installation distance M, the correction processing can be executed after the detection by the detector 4 to shorten the processing time until the liquid composition is discharged by the liquid discharge head 5. In this embodiment, since the distance between the detector 4 and the liquid discharge head 5 in the X direction can be decreased by simplifying and speeding up the processing, the size of the electrode printing apparatus 1c can be reduced.

Note that the electrode printing apparatus according to each embodiment may be employed as an energy storage device manufacturing apparatus by providing, as needed, a device for executing various processes on the upstream side or the downstream side of the liquid discharge head 5.

In addition to the electrode printing apparatus 1 for supplying a liquid to an electrode substrate, the energy storage manufacturing apparatus described above can include, for example, an electrode substrate processing unit that performs processes on the electrode substrate, which has resin layer portions or inorganic layer portions formed thereon, in preparation for cell assembly.

<Electrode Substrate Processing Unit>

The electrode substrate processing unit processes the electrode substrate, which has resin layer portions (resin layer) or inorganic layer portions (inorganic layer) formed thereon, downstream of the liquid discharge head 5. The electrode substrate processing unit may perform at least one of cutting, folding, or pasting. The electrode substrate processing unit can, for example, cut the electrode substrate, which has the resin layer portions or the inorganic layer portions formed thereon, to fabricate an electrode substrate stack. The electrode substrate processing unit can wind or stack the electrode substrate which has the resin layer portions or the inorganic layer portions formed thereon. If the insulating layer contains a material which has a melting point or a glass-transition temperature, a part of one electrode substrate stack may be adhered to another electrode substrate stack in the electrode substrate processing unit.

The electrode substrate processing unit includes, for example, an electrode substrate processing device. Cutting of the electrode substrate which has the resin layer portions or the inorganic-layer portions thereon, Z-folding, stacking, or winding of the electrode substrate, thermal bonding electrode substrates after the stacking or winding, and the like are performed by the electrode substrate processing unit in accordance with the desired form of battery. When the electrode substrate processing unit is to process the electrode substrate which has the resin layer portions (resin layer) or the inorganic layer portions (inorganic layer) formed thereon, the conveyance speed of the electrode substrate may be set to a relatively low speed to reduce damage such as wrinkling of the processed electrode substrate.

An electrode substrate processing process performed by the electrode substrate processing unit is, for example, a process for processing the electrode substrate, which has the resin layer portions or the inorganic layer portions formed there on, downstream of the liquid discharge head 5. The electrode substrate processing process may include at least one of a cutting process, a folding process, or an adhesion process.

TABLE 1 is an example of the result of an experiment that examined the relationship between the installation distance M and the positional shift amount of one resin layer portion 2b formed on the electrode substrate.

TABLE 1

| INSTALLATION DISTANCE [mm] | WIDTH VARIATION [mm] | SKEW VARIATION [mm] | TOTAL [mm] |
| --- | --- | --- | --- |
| 300.0 | 0.15 | 0.09 | 0.24 |
| 1000.0 | 0.5 | 0.3 | 0.8 |
| 3000.0 | 1.5 | 0.9 | 2.4 |

When the installation distance M was 3000.0 mm, a width variation of 1.0 mm was observed in the resin layer portion 2b in the Y direction. When the installation distance M was 1000.0 mm, a skew variation of 0.3 mm occurred. Note that skew variation represents a positional shift accompanying the tilting (rotating) of the resin layer portion 2b on the surface of the electrode substrate.

In this manner, the positional shifts such as the width variation and the skew variation change in accordance with the installation distance M. When the installation distance M was 300.0 mm, the total of the width variation and the skew variation (henceforth referred to as "the total") was 0.24 mm. When the installation distance M was 1000.0 mm, the total was 0.8 mm. When the installation distance M was 3000.0 mm, the total was 2.4 mm.

From the result of the experiment described above, for example, in order to suppress the total to be less than or equal to ½ (0.5 mm) of the specification value when the specification value of the width P of protrusion from the resin layer portion 2b with respect to the electrode composition layer portion 2a is set to 1.0 mm or less, it was found that the installation distance can be set to 300.0 mm or less.

Although the embodiments have been described above, the present disclosure is not limited to the specific embodiments disclosed above, and various modifications and changes can be implemented without departing from the scope of the claims.

Each of the embodiments has exemplified an arrangement in which a liquid discharger discharges a liquid based on image data. However, the disclosure is not limited to this. For example, the liquid discharger may be arranged to discharge the liquid based on the detection information obtained by a detector. In such a case, the generator 17, in the functional arrangement illustrated in FIG. 21, may use the combined detection information, which is input from the obtainment unit 13 when the resin layer portions (resin layer) 2b are formed on the electrode substrate by the electrode printing apparatus 1c, to generate real-time image data which corresponds to the change in the electrode composition layer portions 2a. Subsequently, the generator 17 may output the generated image data to the controller 15. The controller 15 can form the resin layer portions (resin layer) 2b on the electrode substrate by causing the liquid composition to be discharged based on the image data input from the generator 17.

In addition, an arrangement in which a liquid discharger directly discharges a liquid onto an electrode substrate to form resin layer portions (resin layer) or inorganic layer portions (inorganic layer) on the electrode substrate has been described as an example of a case where the resin layer portions or the inorganic layer portions are formed by a liquid discharge process. However, an arrangement in which the resin layer portions (resin layer) or the inorganic layer portions (inorganic layer) are formed by indirectly discharging a liquid onto the electrode substrate may also be employed in the manner of the arrangements illustrated in FIGS. 24A and 24B. An arrangement which indirectly discharges a liquid to form the resin layer portions (resin layer) or the inorganic layer portions (inorganic layer) on the electrode substrate may be, for example, an arrangement that employs a method (transfer printing method) in which ink is applied to a substrate through a transfer printing process. FIGS. 24A and 24B illustrate examples of printing units that employ the transfer printing method.

FIGS. 24A and 24B are views each illustrating an example of the arrangement of a printing unit that employs the transfer printing method. FIG. 24A illustrates a printing unit that uses an intermediate transfer drum, and FIG. 24B illustrates a printing unit that uses an endless intermediate transfer belt.

A printing unit 400' illustrated in FIG. 24A is an inkjet printer that forms a functional layer on a base material (electrode substrate) by transferring a liquid composition onto the base material via an intermediate transfer member 4001.

The printing unit 400' includes an inkjet unit 420, a transfer drum 4000, a pre-processing unit 4002, an absorbing unit 4003, a heating unit 4004, and a cleaning unit 4005.

The inkjet unit 420 includes a head module 422 that holds a plurality of liquid discharge heads 1001. The liquid discharge heads 1001 discharge liquid ink onto the intermediate transfer member 4001 supported by the transfer drum 4000 and forms an ink layer on the intermediate transfer member 4001. Each liquid discharge head 1001 is a line printhead on which nozzles are arranged in a range covering the width of the printing area of the largest base material that can be used. Each liquid discharge head 1001 includes, on its lower surface, a nozzle face with nozzles formed therein. The nozzle face faces the surface of the intermediate transfer member 4001 with a minute gap therebetween. Since the intermediate transfer member 4001 is arranged to move along a circular orbit in the case of this embodiment, the plurality of liquid discharge heads 1001 are arranged radially.

The transfer drum 4000 faces an impression cylinder 621 and forms a transfer nip portion. The pre-processing unit 4002 applies a reaction liquid on the intermediate transfer member 4001 to increase the viscosity of the ink before the ink discharge operation by the liquid discharge heads 1001. The absorbing unit 4003 absorbs a liquid component from the ink layer on the intermediate transfer member 4001 before the transfer. The heating unit 4004 heats the ink layer on the intermediate transfer member 4001 before the transfer. Heating the ink layer will melt the resin in the ink layer and improve transferability onto the base material. The cleaning unit 4005 cleans the surface of the intermediate transfer member 4001 after the transfer to remove remaining ink and debris such as dust on the intermediate transfer member 4001.

The outer peripheral surface of the impression cylinder 621 is pressed against the intermediate transfer member 4001, and the ink layer on the intermediate transfer member 4001 is transferred onto the base material when the base material passes through the transfer nip portion between the impression cylinder 621 and the intermediate transfer member 4001. Note that at least one grip mechanism that can hold the leading-edge portion of the base material may be arranged on the outer peripheral surface of the impression cylinder 621.

A printing unit 400" illustrated in FIG. 24B is an inkjet printer that forms a functional layer on the surface of a base material by transferring a liquid composition onto the base material via an intermediate transfer belt 4006.

The printing unit 400" discharges ink droplets from the plurality of liquid discharge heads 1001, which are arranged in the inkjet unit 420, to form an ink layer on the outer peripheral surface of the intermediate transfer belt 4006. The ink layer formed on the intermediate transfer belt 4006 is dried by a drying unit 4007, and the ink layer becomes a film on the intermediate transfer belt 4006.

The ink layer that has become a film on the intermediate transfer belt 4006 is transferred to the base material at the transfer nip portion where the intermediate transfer belt 4006 faces a transfer roller 622. A cleaning roller 4008 cleans the surface of the intermediate transfer belt 4006 after the transfer.

The intermediate transfer belt 4006 is wound around a driving roller 4009a, an opposing roller 4009b, a plurality of (four in this example) shape maintenance rollers 4009c, 4009d, 4009e, and 4009f, and a plurality of (four in this example) support rollers 4009g, and moves in the direction indicated by arrows in FIG. 24B. The support rollers 4009g which are disposed to face the liquid discharge head 1001 maintain the tension of the intermediate transfer belt 4006 when ink droplets are to be discharged from the liquid discharge head 1001.

<Arrangement of Liquid Discharge Head>

Figure 25:
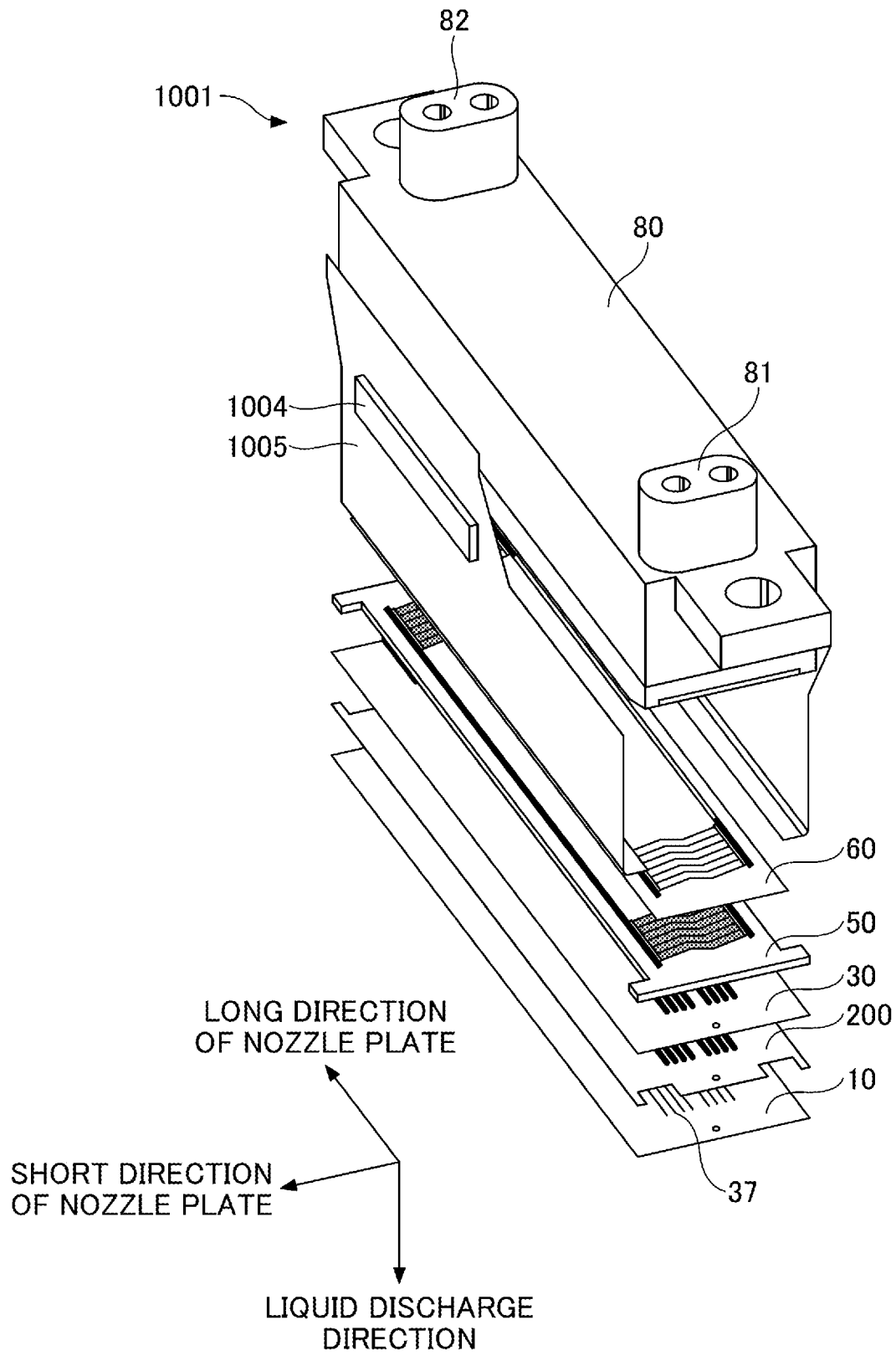
FIG. 25 is a schematic exploded view illustrating an example of a liquid discharge head.
Figure 26:
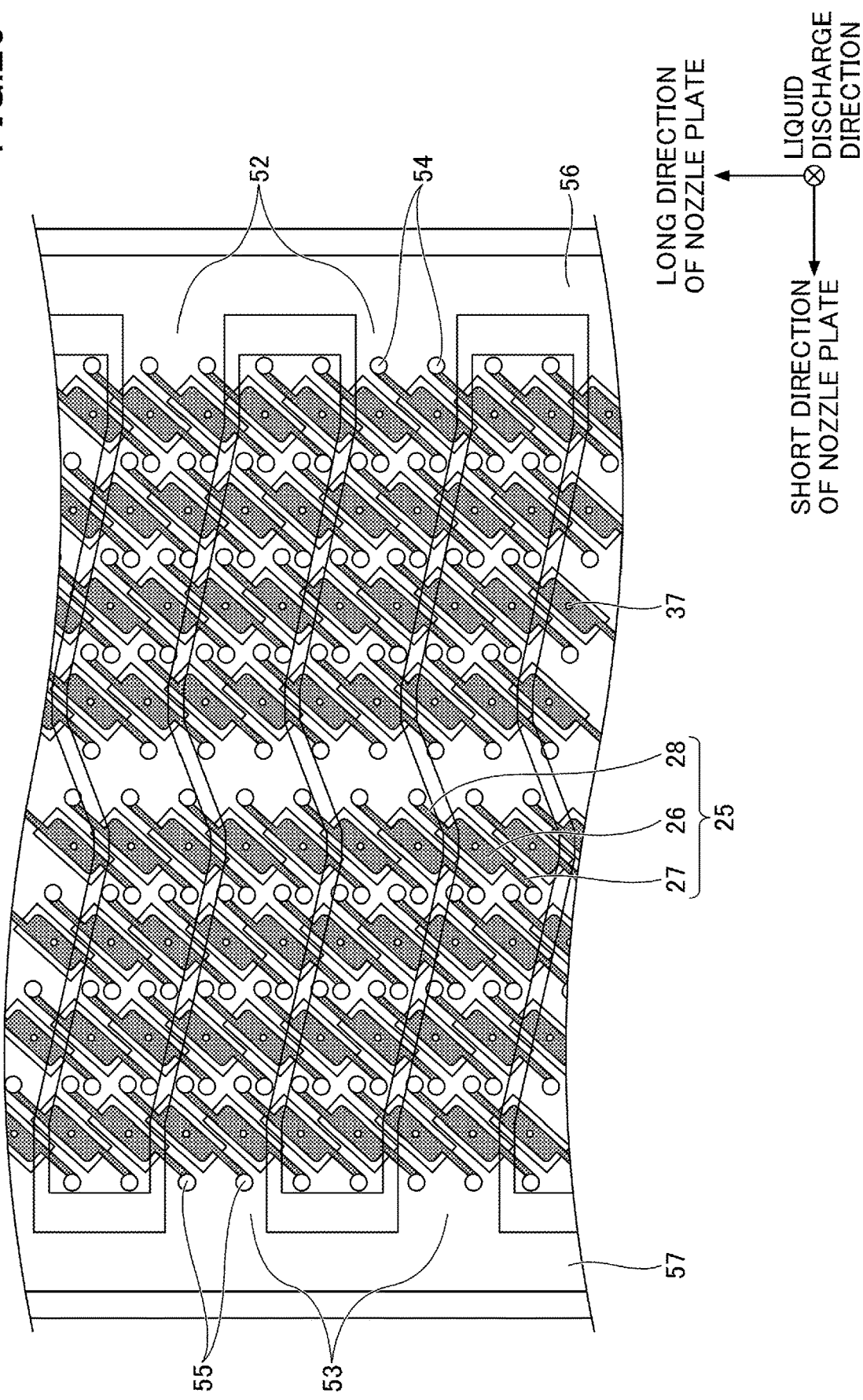
FIG. 26 is an explanatory view illustrating an example of the arrangement of channels of the liquid discharge head.
Figure 27:
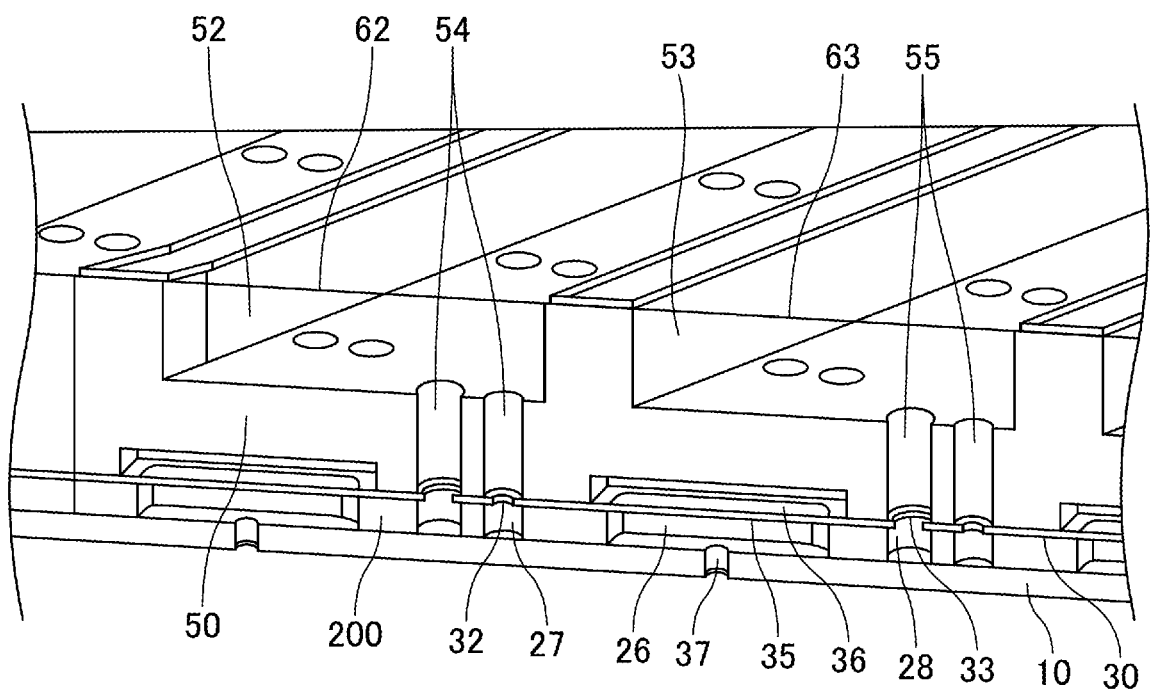
FIG. 27 is a perspective, cross-sectional view illustrating the arrangement of the channels of the liquid discharge head.

The arrangement of the liquid discharge head will be described next with reference FIGS. 25 to 27. FIG. 25 is a schematic exploded view illustrating an example of the liquid discharge head, FIG. 26 is an explanatory view illustrating an example of the arrangement of channels of the liquid discharge head, and FIG. 27 is a perspective, cross-sectional view illustrating an example of the arrangement of the channels of the liquid discharge head.

The liquid discharge head 1001 includes a nozzle plate 10, a channel plate (individual channel member) 200, a vibration plate member 30, a common channel member 50, a damper member 60, a frame member 80, and a circuit board (flexible printed circuit board) 1005 with a driving circuit 1004 mounted thereon.

The nozzle plate 10 includes a plurality of nozzles 37 for discharging ink. The plurality of nozzles 37 are arrayed two-dimensionally in the short direction of the nozzle plate and the long direction of the nozzle plate which are orthogonal to each other.

The channel plate 200 includes a plurality of liquid chambers (individual pressure chambers) 26, a plurality of supply channels (individual supply channels) 27, and a plurality of recovery channels (individual recovery channels) 28. Each liquid chamber 26 communicates with a corresponding one of the plurality of nozzles 37. Each supply channel 27 and each recovery channel 28 communicate with a corresponding one of the plurality of liquid chambers 26. Note that a set of one liquid chamber 26, one supply channel 27, and one recovery channel 28 which communicate with the liquid chamber 26 will also be collectively referred to as individual channels 25 for the sake of descriptive convenience hereinafter.

The vibration plate member 30 forms each vibration plate 35 that serves as a wall surface which allows deformation of the liquid chamber 26. A piezoelectric element 36 is provided integrally in the vibration plate 35. Respective supply-side openings 32 communicating with the supply channels 27 and respective recovery-side opening 33 communicating with the recovery channels 28 are formed in the vibration plate member 30. The piezoelectric element 36 causes the vibration plate 35 to deform to apply pressure to the ink in the liquid chamber 26.

Note that the channel plate 200 and the vibration plate member 30 need not be restricted to separate members. For example, an SOI (Silicon on Insulator) substrate can be used to integrally form the channel plate 200 and the vibration plate member 30 by a same member.

That is, by using an SOI substrate obtained by sequentially depositing a silicon oxide film, a silicon layer, and a silicon oxide film on a silicon substrate, the silicon substrate can be the channel plate 200, and each vibration plate 35 can be formed by using the silicon oxide film, the silicon layer, and the silicon oxide film. In this arrangement, the layer structure of the SOI substrate formed by the silicon oxide film, the silicon layer, and the silicon oxide film can be used as the vibration plate member 30. In this manner, the vibration plate member 30 may be a member formed by a material deposited on the surface of the channel plate 200.

In the common channel member 50, a plurality of common supply sub-channels 52 communicating with two or more supply channels 27 and a plurality of common recovery sub-channels 53 communicating with two or more recovery channels 28 are formed so that one common supply sub-channel 52 and one common recovery sub-channel 53 are arranged adjacently to each other in repetition along the long direction of the nozzle plate. Through holes that serve as supply orifices 54 to allow each common supply sub-channel 52 to communicate with the corresponding supply-side openings 32 of the supply channels 27 and through holes that serve as recovery orifices 55 to allow each common recovery sub-channel 53 to communicate with the corresponding recovery-side openings 33 of the recovery channels 28 are formed in the common channel member 50.

One or a plurality of common supply main channels 56 leading to the plurality of common supply sub-channels 52 and one or a plurality of common recovery main channels 57 leading to the plurality of common recovery sub-channels 53 are formed in the common channel member 50.

The damper member 60 includes supply-side dampers 62, each facing the supply orifices 54 of the corresponding common supply sub-channel 52, and recovery-side dampers 63, each facing the recovery orifices 55 of the corresponding common recovery sub-channel 53. The common supply sub-channels 52 and the common recovery sub-channels 53 are formed by sealing grooves, which are alternately arrayed in the same common channel member 50, with the supply-side dampers 62 and the recovery-side dampers 63 of the damper member 60. Note that a thin metal film or a thin inorganic film with resistance to organic solvents may preferably be used as a material for the dampers of the damper member 60. The thickness of the portion where the damper member 60 includes the supply-side dampers 62 and the recovery-side dampers 63 may preferably be 10 µm or less.

A protective film for protecting the inner wall surface from the ink flowing in the channel is formed on the respective inner wall surfaces of the common supply sub-channels 52, the common recovery sub-channels 53, the common supply main channels 56, and the common recovery main channels 57. For example, a silicon substrate can be annealed to form a silicon oxide film on the respective inner wall surfaces of the common supply sub-channels 52, the common recovery sub-channels 53, the common supply main channels 56, and the common recovery main channels 57. A tantalum-silicon oxide film for protecting the surface of the silicon substrate from the ink can also be formed on the silicon oxide film.

A supply port 81 and a discharge port 82 are included on the frame member 80. The supply port 81 supplies ink to the common supply main channels 56, and the discharge port 82 discharges ink discharged from the common recovery main channels 57.

As described above, the liquid discharge head 1001 includes the nozzles 37 that discharge ink, the liquid chambers 26 that communicate with the nozzles 37, the supply channels 27 that supply ink to the liquid chambers 26, and the recovery channels 28 that recovers ink from the liquid chambers 26. The liquid discharge head 1001 is an example of a "liquid discharge head", the liquid chamber 26 is an example of a "liquid chamber", the supply channel 27 is an example of a "supply channel", and the recovery channel 28 is an example of a "recovery channel".

Figure 28:
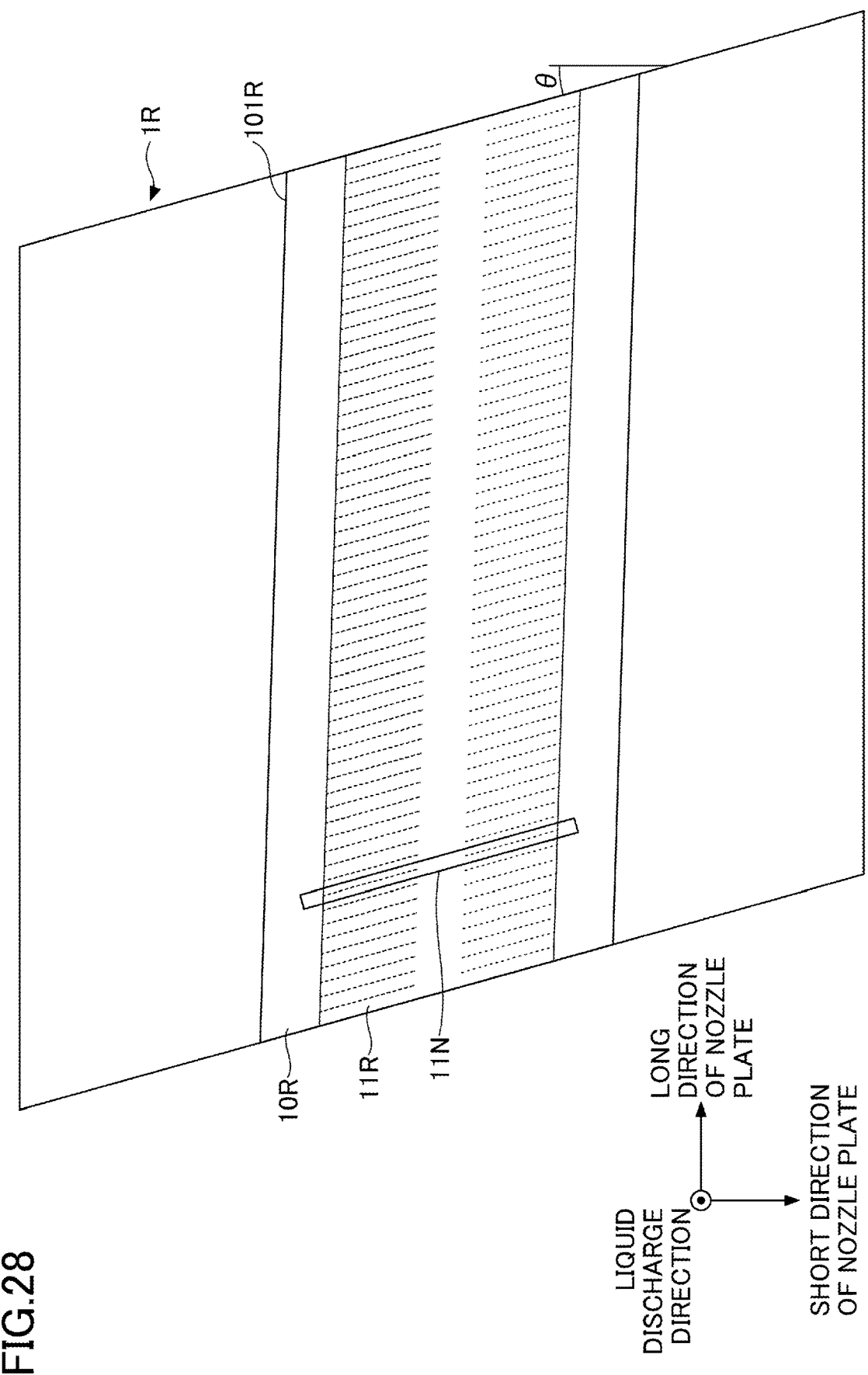
FIG. 28 is a view illustrating an example of the arrangement of the liquid discharge head including a parallelogram-shaped nozzle plate.
Figure 29:
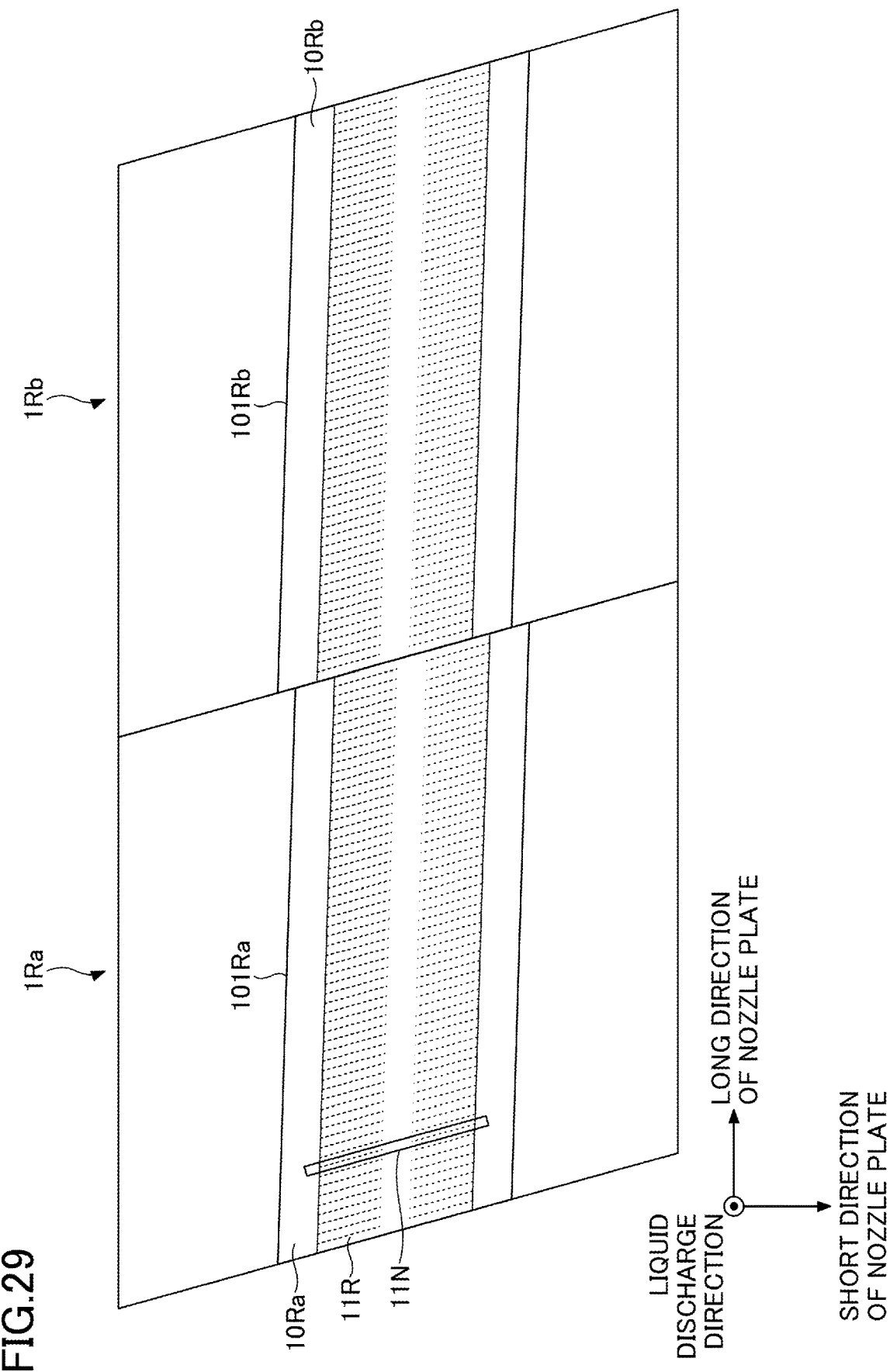
FIG. 29 is a view illustrating a state in which a plurality of liquid discharge heads of FIG. 28 are arrayed.

Note that in the arrangement of the liquid discharge head 1001, the shape of the nozzle surface (the surface on which the nozzles 37 are formed) of the nozzle plate 10 is not limited to a rectangle and may be a shape other than a rectangle, for example, a trapezoid, rhombus, or a parallelogram. An example of this will be described with reference to FIGS. 28 and 29. FIG. 28 is a view illustrating an example of the arrangement of a liquid discharge head including a nozzle plate in the shape of a parallelogram. FIG. 29 is an explanatory view illustrating a state in which a plurality of the liquid discharge heads illustrated in FIG. 28 are arranged.

A liquid discharge head 1R has an outer shape (edge) tilted toward the short direction of the nozzle plate at an angle of θ°. The liquid discharge unit 101R and the nozzle plate 10R of the liquid discharge head 1R are also formed in a shape along the edge. That is, the liquid discharge unit 101R includes the nozzle plate 10R whose outer shape is a parallelogram, and a plurality of nozzles 11R are regularly arrayed in a two-dimensional manner on the nozzle plate 10R. The nozzles 11R are arranged, for example, such that N nozzles 11R form one nozzle column 11N and a plurality of the nozzle columns 11N are arrayed in parallel to the above-described edge in the long direction of the nozzle plate, which is perpendicular to the short direction of the nozzle plate.

The liquid discharge head 1R having the above-described arrangement can be arranged so that a plurality of plurality of liquid discharge heads 1Ra and 1Rb can be aligned in a single column in the long direction of the nozzle plate as illustrated in FIG. 29. As a result, a line head of a desired length can be obtained in accordance with the printing width of the base material to be used.

The liquid discharge apparatus according to the embodiments is not limited to the electrode printing apparatus. For example, the liquid discharge apparatus according to the embodiments may be an image forming apparatus that forms an image on a recording medium such as a print sheet.

The embodiments also include an electrode manufacturing method. An electrode manufacturing method is an electrode manufacturing method performed by an electrode manufacturing apparatus for discharging a liquid to form a resin layer or an inorganic layer on an electrode substrate which is being conveyed in a predetermined direction, the electrode manufacturing method including: detecting, by a detector, a plurality of points where a property varies on the electrode substrate along a direction intersecting the predetermined direction; and controlling, by a controller, a discharge condition of a liquid discharger provided on a downstream side of the detector in the predetermined direction and configured to discharge the liquid to form the resin layer or the inorganic layer, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information. Effects similar to those of the above-described electrode manufacturing apparatus (electrode printing apparatus) can obtained by such an electrode manufacturing method.

The embodiments also include a non-transitory recording medium storing a program. For example, the non-transitory recording medium storing a program is a non-transitory computer-readable recording medium having a program embodied therein for causing an electrode manufacturing apparatus to execute a process, the electrode manufacturing apparatus configured to discharge a liquid to form a resin layer or an inorganic layer on an electrode substrate which is being conveyed in a predetermined direction, the process including: detecting, by a detector, a plurality of points where a property varies on the electrode substrate along a direction intersecting the predetermined direction; and controlling, by a controller, a discharge condition of a liquid discharger provided on a downstream side of the detector in the predetermined direction and configured to discharge the liquid to form the resin layer or the inorganic layer, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information. Effects similar to those of the above-described electrode manufacturing apparatus (electrode printing apparatus) can obtained by such a non-transitory recording medium storing a program.

Numbers such as ordinal numbers, quantities, and the like used in the description of the embodiments are merely examples for illustrating the techniques of this disclosure in detail, and the disclosure is not limited to the exemplified numbers. The relationships of connections between the components are exemplified to provide a detailed illustration of the techniques of the disclosure, and the relationships of connections for implementing the functions of the present disclosure are not limited to those that are illustrated.

Note that the division of the blocks illustrated in the functional diagrams is merely an example. The plurality of blocks may be implemented as a single block, divided into two or more blocks, and/or some of the functions may be transferred to another block. Furthermore, the functions of a plurality of blocks that have similar functions may be processed by a piece of hardware or software by parallel processing or time-sharing.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

The aspects of the disclosure are, for example, as follows.

<1> An electrode manufacturing apparatus for discharging a liquid to form a resin layer or an inorganic layer on an electrode substrate which is being conveyed in a predetermined direction, the electrode manufacturing apparatus including: a detector; a liquid discharger provided on a downstream side of the detector in the predetermined direction and configured to discharge the liquid to form the resin layer or the inorganic layer; and a controller configured to control a discharge condition of the liquid discharger, wherein a plurality of points where a property varies are present on the electrode substrate along a direction intersecting the predetermined direction, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information.

<2> The electrode manufacturing apparatus of <1>, wherein during a predetermined time or a period in which the electrode substrate is being conveyed a predetermined conveyance distance, the detector outputs the plurality of pieces of detection information detected in time series.

<3> The electrode manufacturing apparatus of <1> or <2>, wherein the direction intersecting the predetermined direction is a direction perpendicular to the predetermined direction.

<4> The electrode manufacturing apparatus of <1> to <3>, wherein the property includes at least one of thickness, color, reflectance, or any combination thereof of the electrode substrate.

<5> The electrode manufacturing apparatus of <1> to <4>, wherein the detector includes a light emitting element configured to illuminate a spot on the electrode substrate, and a light receiving element configured to receive reflected light from the spot on the electrode substrate and to output an electrical signal corresponding to an intensity of the reflected light from the spot on the electrode substrate, and wherein the light emitting element is configured to illuminate the spot such that one of the plurality of points is included in the spot, the plurality of pieces of detection information include the electrical signal output from the light receiving element in time series, and the controller is configured to control the discharge condition in accordance with a fluctuation in at least one of a voltage value, a current value of the electrical signal, or any combination thereof.

<6> The electrode manufacturing apparatus of <1> to <5>, wherein a point where a property varies is also present on the electrode substrate along the predetermined direction, and the combined detection information includes information about a position of one of the plurality of points present on the electrode substrate along the direction intersecting the predetermined direction, and information about a position of the point present on the electrode substrate along the predetermined direction.

<7> The electrode manufacturing apparatus of <1> to <6>, wherein the electrode manufacturing apparatus is configured to discharge the liquid based on image data, the electrode manufacturing apparatus includes a storage device configured to store a plurality of image data, which have different widths in the direction intersecting the predetermined direction, in association with the combined detection information, and the controller is configured to control the discharge condition of the liquid discharger in accordance with the image data obtained by referring to the storage device based on the combined detection information.

<8> The electrode manufacturing apparatus of <7>, further including: a generator configured to generate, based on the combined detection information obtained by combining the plurality of pieces of detection information detected by the detector, the plurality of image data which have different widths in the direction intersecting the predetermined direction, wherein the generator is configured to generate the plurality of image data before the electrode manufacturing apparatus performs an operation to discharge the liquid to form the resin layer or the inorganic layer on the electrode substrate which is being conveyed in the predetermined direction, and the storage device is configured to store the plurality of image data generated by the generator.

<9> The electrode manufacturing apparatus of <1> to <8>, wherein a distance between the detector and the liquid discharger in the predetermined direction is less than or equal to 300.0 mm.

<10> The electrode manufacturing apparatus of <1> to <9>, wherein a first film area which has been formed in a predetermined pattern is present on the electrode substrate, and the controller is configured to control, based on the combined detection information, the discharge condition of the liquid discharger such that the liquid discharged by the liquid discharger forms a second film area to cover the first film area.

<11> The electrode manufacturing apparatus of <10>, wherein the controller is configured to control the discharge condition of the liquid discharger to form the second film area to cover the first film area such that the second film area protrudes from the first film area by a predetermined length along the predetermined direction and the direction intersecting the predetermined direction on the electrode substrate, and the predetermined length is less than or equal to 1.0 mm.

<12> The electrode manufacturing apparatus of <10>, a downstream detector provided on a downstream side of the liquid discharger in the predetermined direction, wherein the downstream detector is configured to output a plurality of pieces of downstream detection information obtained by detecting, in time series, at least one of the plurality of points where the property varies on the electrode substrate, and the controller is configured to control the discharge condition of the liquid discharger based on combined downstream detection information obtained by combining the plurality of pieces of downstream detection information.

<13> An energy storage device manufacturing apparatus including the electrode manufacturing apparatus of any one of <1> to <12>.

<14> A liquid discharge apparatus for discharging a liquid onto a liquid discharge target which is being conveyed in a predetermined direction, the liquid discharge apparatus including: a detector; a liquid discharger provided on a downstream side of the detector in the predetermined direction; and a controller configured to control a discharge condition of the liquid discharger, wherein a plurality of points where a property varies are present on the liquid discharge target along a direction intersecting the predetermined direction, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information.

<15> An electrode manufacturing method performed by an electrode manufacturing apparatus for discharging a liquid to form a resin layer or an inorganic layer on an electrode substrate which is being conveyed in a predetermined direction, the electrode manufacturing method including: detecting, by a detector, a plurality of points where a property varies on the electrode substrate along a direction intersecting the predetermined direction; and controlling, by a controller, a discharge condition of a liquid discharger provided on a downstream side of the detector in the predetermined direction and configured to discharge the liquid to form the resin layer or the inorganic layer, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information.

<16> A non-transitory computer-readable recording medium having a program embodied therein for causing an electrode manufacturing apparatus to execute a process, the electrode manufacturing apparatus being configured to discharge a liquid to form a resin layer or an inorganic layer on an electrode substrate which is being conveyed in a predetermined direction, the process including: detecting, by a detector, a plurality of points where a property varies on the electrode substrate along a direction intersecting the predetermined direction; and controlling, by a controller, a discharge condition of a liquid discharger provided on a downstream side of the detector in the predetermined direction and configured to discharge the liquid to form the resin layer or the inorganic layer, wherein the detector is configured to output a plurality of pieces of detection information obtained by detecting at least one of the plurality of points in time series, and wherein the controller is configured to control the discharge condition of the liquid discharger based on combined detection information obtained by combining the plurality of pieces of detection information.

What is claimed is:

1. An electrode manufacturing method performed by an electrode manufacturing apparatus for discharging a liquid to form a resin layer or an inorganic layer on an electrode substrate which is being conveyed in a predetermined direction, the electrode manufacturing method comprising:
   detecting, by a plurality of detectors, a plurality of boundaries between regions where an electrode active material layer is formed and regions where the electrode active material layer is not formed on the electrode substrate, the plurality of boundaries being present in the predetermined direction and in a direction intersecting the predetermined direction, the detecting including;

detecting the boundaries of the electrode active material layer in the predetermined direction; and detecting the boundaries of the electrode active material layer in the direction intersecting the predetermined direction;

outputting, in time series, a plurality of pieces of detection information respectively corresponding to the boundaries detected in the detecting; and controlling, by a controller, a discharge condition of a liquid discharger provided on a downstream side of the detectors in the predetermined direction and discharging the liquid to form the resin layer or the inorganic layer based on combined detection information obtained by combining the plurality of pieces of detection information.

2. The electrode manufacturing method according to claim 1, wherein during a predetermined time or a period in which the electrode substrate is being conveyed a predetermined conveyance distance, the outputting includes the outputting the plurality of pieces of detection information detected in time series.

3. The electrode manufacturing method according to claim 1, wherein the direction intersecting the predetermined direction is a direction perpendicular to the predetermined direction.

4. The electrode manufacturing method according to claim 1, wherein the property includes at least one of thickness, color, reflectance, or any combination thereof of the electrode substrate.

5. The electrode manufacturing method according to claim 1, wherein the detecting includes:

detecting by using a light emitting element that illuminates a spot on the electrode substrate, and detecting by using a light receiving element that receives reflected light from the spot on the electrode substrate and to outputs an electrical signal corresponding to an intensity of the reflected light from the spot on the electrode substrate, and wherein the detecting by using the light receiving element includes illuminating the spot such that one of the plurality of points is included in the spot, the plurality of pieces of detection information include the electrical signal output from the light receiving element in time series, and the controlling includes controlling the discharge condition in accordance with a fluctuation in at least one of a voltage value, a current value of the electrical signal, or any combination thereof.

6. The electrode manufacturing method according to claim 1, further comprising:

discharging the liquid based on image data, storing a plurality of image data, which have different widths in the direction intersecting the predetermined direction, in association with the combined detection information, and the controlling includes controlling the discharge condition of the liquid discharger in accordance with the image data obtained by referring to the storage device based on the combined detection information.

7. The electrode manufacturing method according to claim 6, further comprising:

generating, based on the combined detection information, the plurality of image data which have different widths in the direction intersecting the predetermined direction before the discharging, and storing the generated plurality of image data.

8. The electrode manufacturing method according to claim 1, wherein a distance between the detector and the liquid discharger in the predetermined direction is less than or equal to 300.0 mm.

9. The electrode manufacturing method according to claim 1, wherein a first film area which has been formed in a predetermined pattern is present on the electrode substrate, and the controlling includes controlling, based on the combined detection information, the discharge condition of the liquid discharger such that the liquid discharged by the liquid discharger forms a second film area to cover the first film area.

10. The electrode manufacturing method according to claim 9, wherein the controlling includes controlling the discharge condition of the liquid discharger to form the second film area to cover the first film area such that the second film area protrudes from the first film area by a predetermined length along the predetermined direction and the direction intersecting the predetermined direction on the electrode substrate, and the predetermined length is less than or equal to 1.0 mm.

11. The electrode manufacturing method according to claim 9, further comprising:

outputting, by a downstream detector provided on a downstream side of the liquid discharger in the predetermined direction, a plurality of pieces of downstream detection information obtained by detecting, in time series, at least one of the plurality of points where the property varies on the electrode substrate, and the controlling includes controlling the discharge condition of the liquid discharger based on combined downstream detection information obtained by combining the plurality of pieces of downstream detection information.

12. An energy storage device comprising an electrode manufactured by the electrode manufacturing method according to claim 1.

13. The electrode manufacturing method according to claim 1, wherein the detecting is performed using the plurality of detectors arranged such that a detection area of each detector includes only one boundary extending in the predetermined direction.

14. The electrode manufacturing method according to claim 1, wherein the detecting is performed using the plurality of detectors having a detection area with a width in the direction intersecting the predetermined direction that is equal to or less than a width of a region in which no electrode active material layer is formed between adjacent electrode active material layers.

15. The electrode manufacturing method according to claim 1, wherein the detecting includes detecting the boundaries in the direction intersecting the predetermined direction at a first position in the predetermined direction, and detecting the boundaries in the predetermined direction at a second position in the predetermined direction that is downstream of the first position.

* * * * *